United States Patent
Kuroyama et al.

(10) Patent No.: US 10,455,017 B2
(45) Date of Patent: Oct. 22, 2019

(54) COMMUNICATION SYSTEM, ELECTRIC APPLIANCE, AND PORTABLE TERMINAL DEVICE

(75) Inventors: Kazuhiro Kuroyama, Osaka (JP); Kazunori Kurimoto, Hyogo (JP); Michihiro Matsumoto, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 537 days.

(21) Appl. No.: 14/380,654

(22) PCT Filed: Jul. 26, 2012

(86) PCT No.: PCT/JP2012/004769
§ 371 (c)(1),
(2), (4) Date: Aug. 22, 2014

(87) PCT Pub. No.: WO2013/128501
PCT Pub. Date: Sep. 6, 2013

(65) Prior Publication Data
US 2015/0172385 A1 Jun. 18, 2015

(30) Foreign Application Priority Data
Feb. 28, 2012 (JP) .................................. 2012-041872

(51) Int. Cl.
*G06F 15/16* (2006.01)
*H04L 29/08* (2006.01)
(Continued)

(52) U.S. Cl.
CPC ...... *H04L 67/1097* (2013.01); *H04L 12/2807* (2013.01); *H04L 12/2818* (2013.01);
(Continued)

(58) Field of Classification Search
CPC . H04L 67/00; H04L 67/1097; H04L 12/2807; H04L 12/2818; H04W 84/005
(Continued)

(56) References Cited

U.S. PATENT DOCUMENTS

| 6,571,350 | B1 * | 5/2003 | Kurokawa | G06F 11/1666 711/162 |
| 2006/0080380 | A1 * | 4/2006 | Aizu | H04L 12/2803 709/203 |

(Continued)

FOREIGN PATENT DOCUMENTS

| EP | 2455893 A1 * | 11/2011 | ......... G06K 17/0029 |
| JP | 05-327920 A | 12/1993 | |

(Continued)

OTHER PUBLICATIONS

V. Soundararajan, M. Heinrich, B. Verghese, K. Gharachorloo, A. Gupta and J. Hennessy, "Flexible use of memory for replication/migration in cache-coherent DSM multiprocessors," 25th Annual International Symposium on Computer Architecture (Cat. No. 98CB36235), Barcelona, Spain, 1998, pp. 342-355. (Year: 1998).*

(Continued)

*Primary Examiner* — Oscar A Louie
*Assistant Examiner* — Messeret F Gebre
(74) *Attorney, Agent, or Firm* — Brinks Gilson & Lione

(57) ABSTRACT

A portable terminal device transmits a read request specifying a specific address that is an address shared among a plurality of electric appliances and acquires fixed data from a fixed data storage unit disposed at a specific address of an electric appliance. The fixed data includes setting address information that indicates an address of a setting storage area in which is stored object data that is data to be transmitted to a server device. The portable terminal device acquires setting address information included in the fixed (Continued)

data, and by specifying a read address on the basis of the setting address information and issuing a read request with respect to a variable data storage unit, the portable terminal causes the electric appliance to transmit the object data as read data, acquires the object data from the transmitted read data, and transmits the object data to a server.

13 Claims, 11 Drawing Sheets

(51) Int. Cl.
    *H04L 12/28*        (2006.01)
    *H04W 4/80*        (2018.01)

(52) U.S. Cl.
    CPC ......... *H04W 4/80* (2018.02); *H04L 2012/285* (2013.01); *H04L 2012/2841* (2013.01)

(58) Field of Classification Search
    USPC .......................................................... 709/219
    See application file for complete search history.

(56) References Cited

U.S. PATENT DOCUMENTS

| | | |
|---|---|---|
| 2006/0132330 A1 | 6/2006 | Youn |
| 2007/0232281 A1 | 10/2007 | Nakai et al. |
| 2009/0144348 A1* | 6/2009 | Nishimura .............. G06F 12/04 |
| 2011/0004719 A1* | 1/2011 | Fitzgerald .......... G11C 16/0408 711/1 |
| 2012/0317365 A1* | 12/2012 | Elhamias ............ G06F 12/0862 711/141 |
| 2013/0052946 A1* | 2/2013 | Chatterjee ............... H04W 4/80 455/41.1 |
| 2013/0057388 A1* | 3/2013 | Attanasio ............... G06Q 50/26 340/10.1 |
| 2013/0093592 A1* | 4/2013 | Lan ...................... A01G 25/167 340/602 |

FOREIGN PATENT DOCUMENTS

| | | |
|---|---|---|
| JP | 06-187519 A | 7/1994 |
| JP | H06187519 | * 7/1994 |
| JP | 2005-293159 A | 10/2005 |
| JP | 2005293159 | * 10/2005 |
| JP | 2005-323070 A | 11/2005 |
| JP | 2007-251637 A | 9/2007 |
| JP | 2010-212774 A | 9/2010 |

OTHER PUBLICATIONS

Huang Yu-Ian, "Design and realization of centralized remote monitoring and controlling system based on embedded technology", pp. 193-197, 2007. (Year: 2007).*

R. Barua, W. Lee, S. Amarasinghe and A. Agarwal, "Maps: a compiler-managed memory system for Raw machines," Proceedings of the 26th International Symposium on Computer Architecture (Cat. No. 99CB36367), Atlanta, GA, USA, 1999, pp. 4-15. (Year: 1999).*

A. Nowatzyk, G. Aybay, M. Browne, E. Kelly, D. Lee and M. Parkin, "The S3.mp scalable shared memory multiprocessor," 1994 Proceedings of the Twenty-Seventh Hawaii International Conference on System Sciences, Wailea, HI, USA, 1994, pp. 144-153. (Year: 1994).*

International Search Report in corresponding International Application No. PCT/JP2012/004769, dated Sep. 4, 2012, 1 page.

* cited by examiner

FIG.4A

| FORMAT INFORMATION (FORMAT NUMBER 1) | |
|---|---|
| ADDRESS | DATA CONTENT |
| Addr1 | FORMAT NUMBER (1) |
| Addr2 | KEY NUMBER |
| Addr3 | ITEM NUMBER |
| Addr4 | (SETTING ADDRESS INFORMATION) START ADDRESS AND DATA AMOUNT OF OBJECT DATA A |
| Addr5 | (SETTING ADDRESS INFORMATION) START ADDRESS AND DATA AMOUNT OF OBJECT DATA B |
| Addr6 | FIRST VARIABLE STORAGE UNIT ACCESS DISABLED FLAG |
| Addr7 | TIME SETTING FLAG |
| Addr8 | CONTROL INSTRUCTION WRITE ADDRESS |

FIG.4B

| FORMAT INFORMATION (FORMAT NUMBER 2) | |
|---|---|
| ADDRESS | DATA CONTENT |
| Addr1 | FORMAT NUMBER (2) |
| Addr2 | KEY NUMBER |
| Addr3 | ITEM NUMBER |
| Addr4 | (SETTING ADDRESS INFORMATION) START ADDRESS AND DATA AMOUNT OF OBJECT DATA A |
| Addr5 | (SETTING ADDRESS INFORMATION) START ADDRESS AND DATA AMOUNT OF OBJECT DATA B |
| Addr6 | (SETTING ADDRESS INFORMATION) START ADDRESS AND DATA AMOUNT OF OBJECT DATA C |
| Addr7 | (SETTING ADDRESS INFORMATION) START ADDRESS AND DATA AMOUNT OF OBJECT DATA D |
| Addr8 | CONTROL INSTRUCTION WRITE ADDRESS |

FIG.5A

| FIXED DATA (FORMAT NUMBER 1) | | |
|---|---|---|
| ADDRESS | DATA CONTENT | CHECKSUM |
| Addr1 | 1 | (sum VALUE) |
| Addr2 | 2 | (sum VALUE) |
| Addr3 | (ITEM NUMBER) | (sum VALUE) |
| Addr4 | START ADDRESS: Addr10, DATA AMOUNT: 3 | (sum VALUE) |
| Addr5 | START ADDRESS: Addr11, DATA AMOUNT: 2 | (sum VALUE) |
| Addr6 | FIRST VARIABLE STORAGE UNIT ACCESS DISABLED FLAG: 0 | (sum VALUE) |
| Addr7 | TIME SETTING FLAG: 1 | (sum VALUE) |
| Addr8 | CONTROL INSTRUCTION WRITE ADDRESS: Addr15 | (sum VALUE) |

FIG.5B

| FIXED DATA (FORMAT NUMBER 2) | | |
|---|---|---|
| ADDRESS | DATA CONTENT | CHECKSUM |
| Addr1 | 2 | (sum VALUE) |
| Addr2 | 3 | (sum VALUE) |
| Addr3 | (ITEM NUMBER) | (sum VALUE) |
| Addr4 | START ADDRESS: Addr10, DATA AMOUNT: 3 | (sum VALUE) |
| Addr5 | START ADDRESS: Addr11, DATA AMOUNT: 2 | (sum VALUE) |
| Addr6 | START ADDRESS: Addr12, DATA AMOUNT: 3 | (sum VALUE) |
| Addr7 | START ADDRESS: Addr13, DATA AMOUNT: 10 | (sum VALUE) |
| Addr8 | CONTROL INSTRUCTION WRITE ADDRESS: Addr15 | (sum VALUE) |

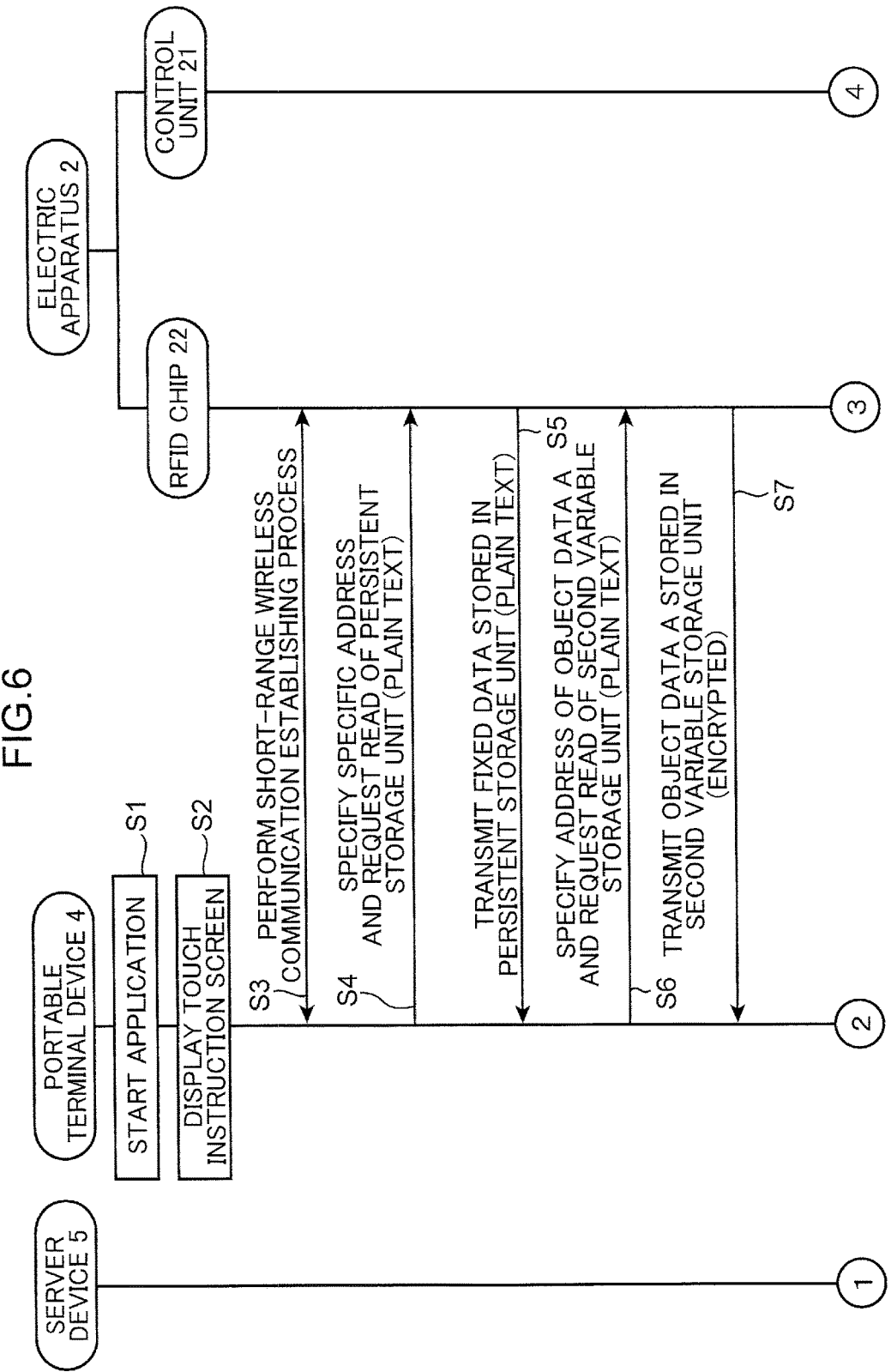

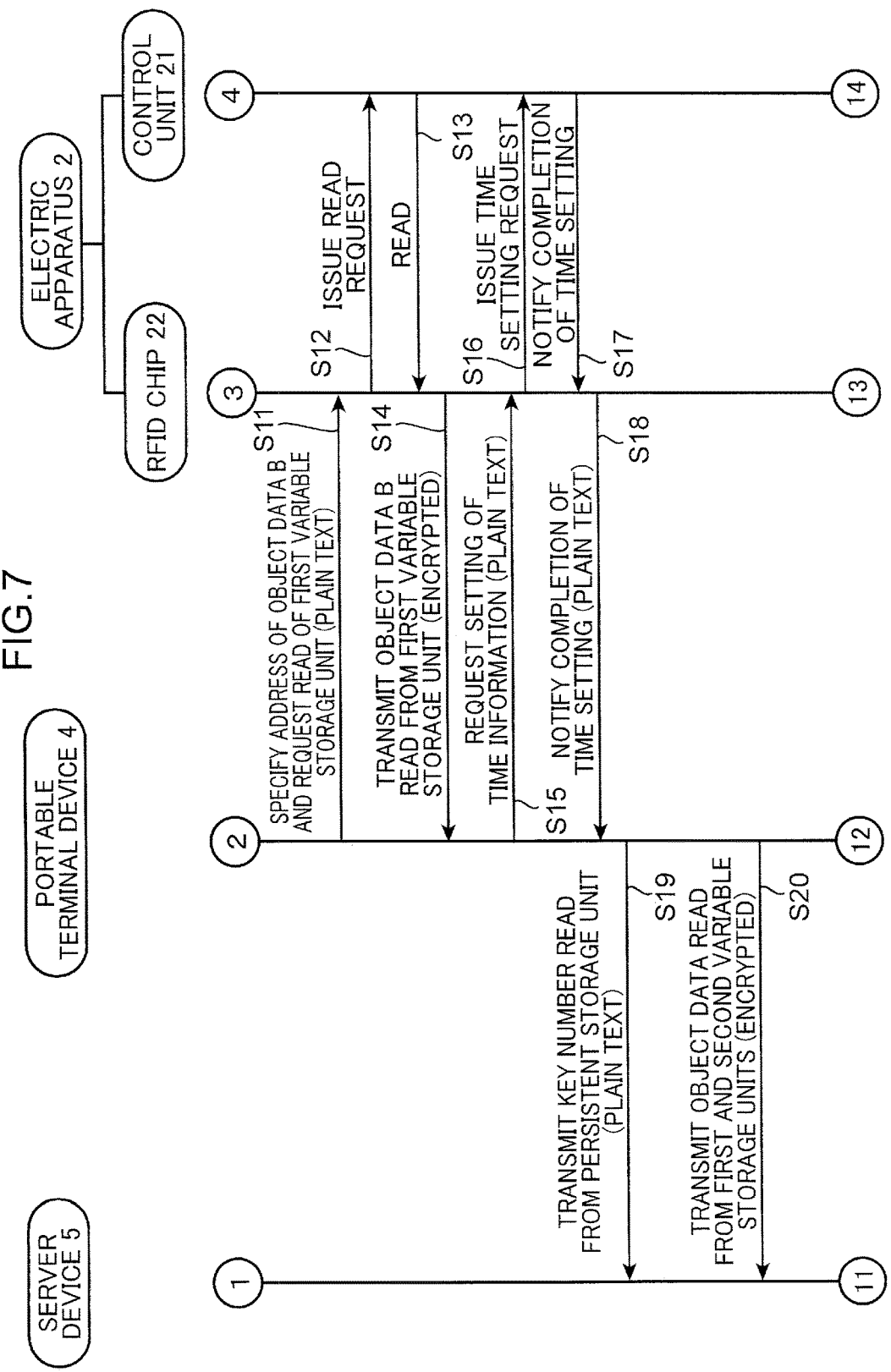

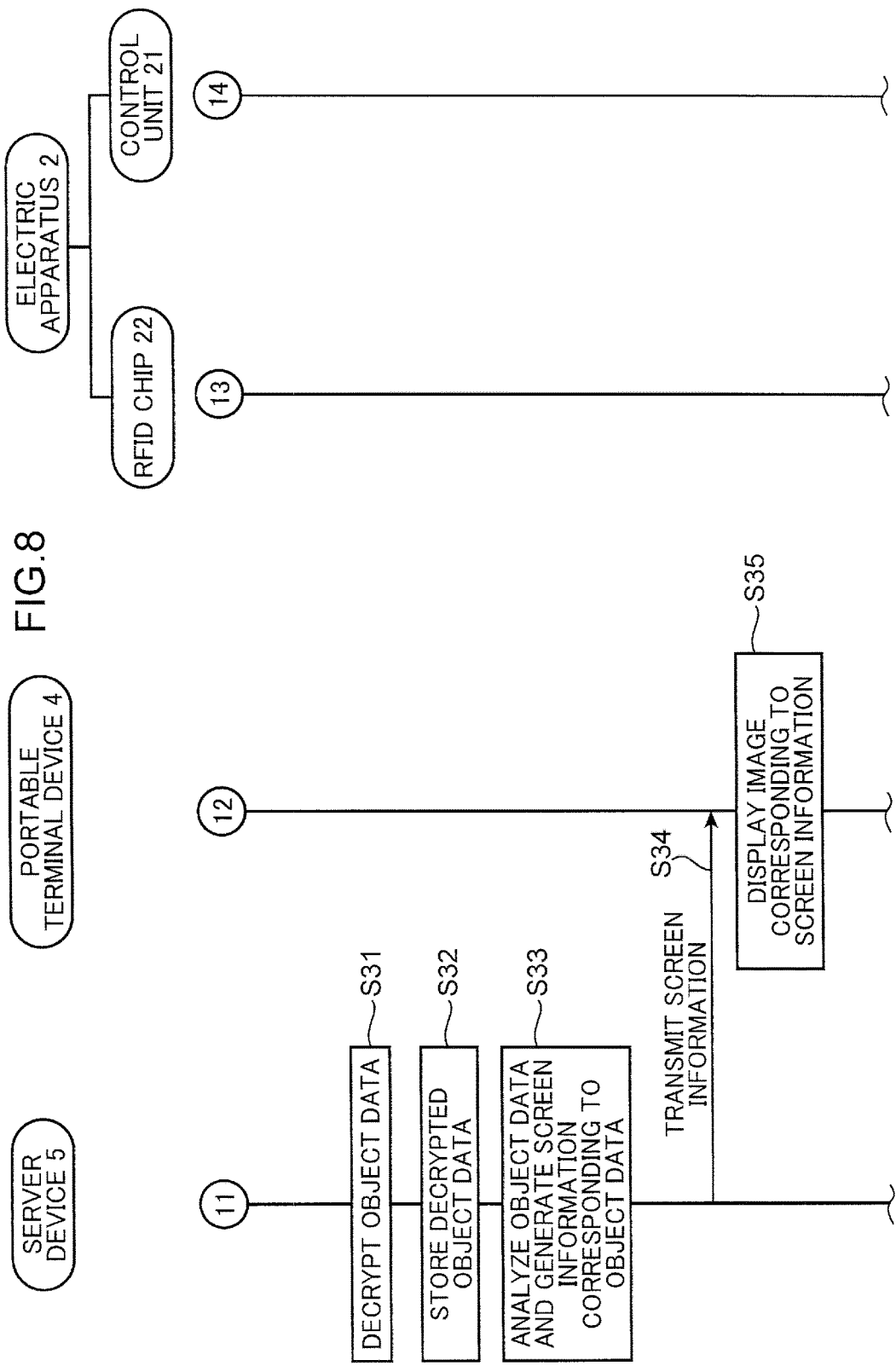

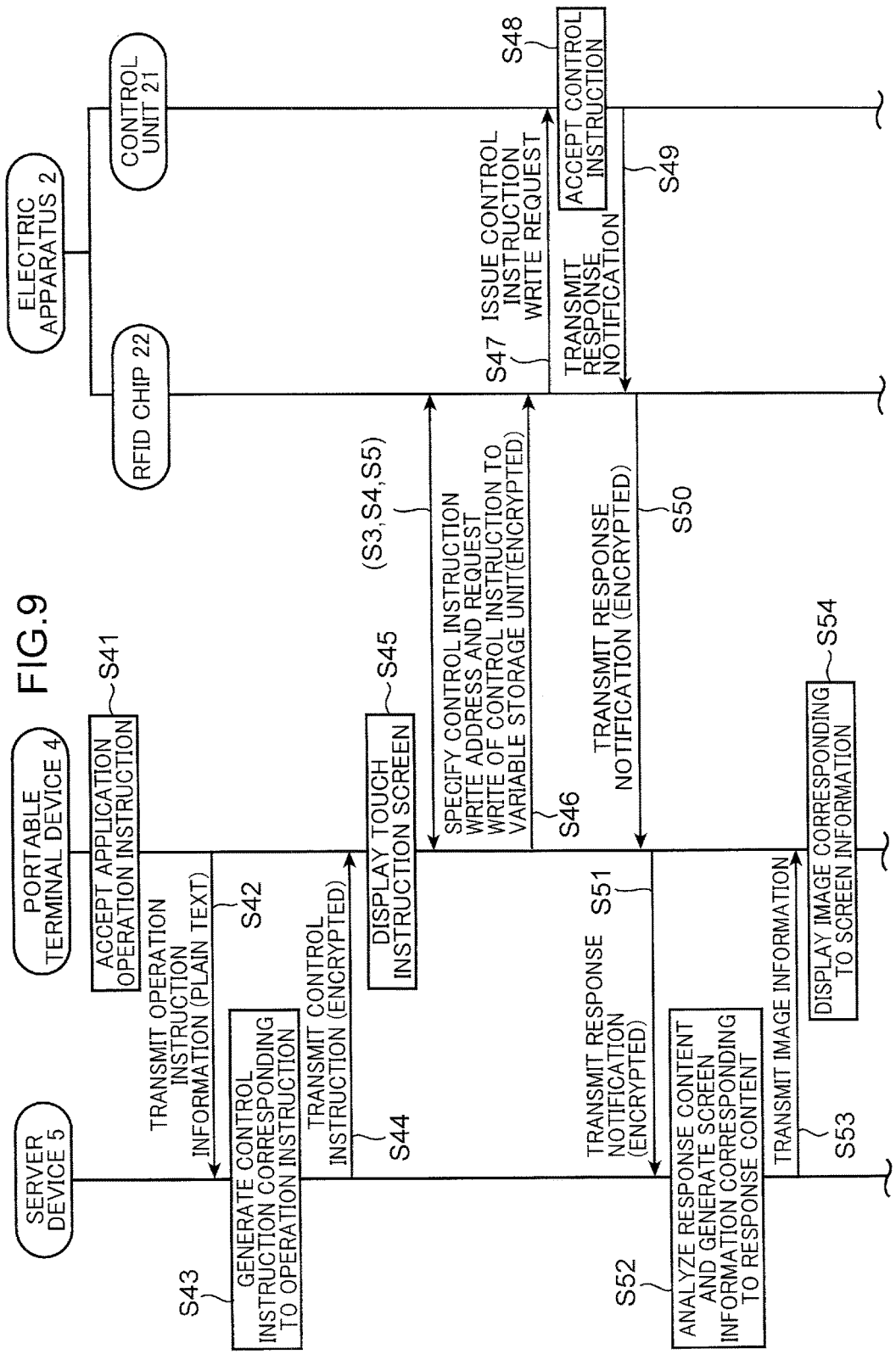

COMMUNICATION SYSTEM, ELECTRIC APPLIANCE, AND PORTABLE TERMINAL DEVICE

This application is a 371 application of PCT/JP2012/004769 having an international filing date of Jul. 26, 2012, which claims priority to JP 2012-041872 filed Feb. 28, 2012, the entire contents of which are incorporated herein by reference.

TECHNICAL FIELD

The present invention relates to a communication system, an electric appliance, and a portable terminal device for transmitting data stored in an electric appliance.

BACKGROUND ART

In recent years, progress has been made toward digitalization and realization of greater functionality of various electrical home appliances such as refrigerators, microwave ovens, washing machines, weight scales, and body fat scales. In accordance with the digitalization and the realization of greater functionality of such electric appliances, attempts are being made to accumulate various kinds of data in an electric appliance, read such data from the electric appliance to outside of the apparatus by wireless communication, and utilize the data to monitor information and provide new services.

As a technique for reading data stored in an apparatus to the outside as described above, a technique is known for reading data stored in a storage unit of a wireless card from a read device by wireless communication by specifying an address of the storage unit and a data length (for example, refer to Patent Document 1).

However, when reading data from various electrical home appliances such as refrigerators, microwave ovens, washing machines, weight scales, and body fat scales, there is a difference in the types and amounts of data that is respectively stored by such appliances. For example, a refrigerator stores internal temperature and the amount of stored data is small. On the other hand, since a body fat scale stores, for example, data related to a body fat ratio that is measured by a user on a daily basis over a long period of time, the amount of stored data is large. In addition, due to circumstances related to the design of each electric appliance, an address where data is stored may differ for each apparatus model.

As described above, unlike cases where specifications have been standardized and a data storage address and a data length are unified such as the case of the wireless card described in the Patent Document, with electric appliances which are available in a large number of types and models such as electrical home appliances, an address where data is stored and the amount of the data differ for each electric appliance. Therefore, there is an inconvenience that reading data stored in such an electric appliance to the outside by specifying an address is difficult.

Patent Document 1: Japanese Patent Application Laid-open No. H6-187519

SUMMARY OF THE INVENTION

An object of the present invention is to provide a communication system, an electric appliance, and a portable terminal device which enable data stored in an electric appliance to be readily read to the outside of the electric appliance by specifying an address.

A communication system according to an aspect of the present invention comprises: an electric appliance; a portable terminal device which communicates with the electric appliance; and a server device which communicates with the portable terminal device via a network, wherein the electric appliance includes: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, the portable terminal device includes: a portable communication unit which communicates with the apparatus communication unit; a network communication unit which communicates with the server device via the network; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network, and the server device includes: a server communication unit which communicates with the network communication unit.

In addition, an electric appliance according to an aspect of the present invention is an electric appliance capable of communicating with a communication system including a portable terminal device equipped with a network communication unit that communicates using a network and a server device equipped with a server communication unit that communicates with the network communication unit via the network, the electric appliance comprising: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, wherein the portable terminal device is capable of operating as: a portable communication unit which communicates with the apparatus communication unit; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network.

Furthermore, a portable terminal device according to an aspect of the present invention is a portable terminal device which is interposed between an electric appliance and a server device and which enables the electric appliance and the server device to communicate with each other, wherein the server device is capable of operating as a server communication unit which communicates with the portable terminal device via the network, the electric appliance is capable of operating as: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, and the portable terminal device comprises: a portable communication unit which communicates with the apparatus communication unit; a network communication unit which communicates with the server device via the network; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network.

BRIEF DESCRIPTION OF THE DRAWINGS

FIG. 4A is an illustrative drawing showing an example of format information that is stored in a format information storage unit shown in FIG. 3.

FIG. 4B is an illustrative drawing showing another example of format information that is stored in a format information storage unit shown in FIG. 3.

FIG. 5A is an illustrative drawing showing an example of fixed data that is stored in a fixed data storage unit shown in FIG. 2.

FIG. 5B is an illustrative drawing showing an example of fixed data that is stored in the fixed data storage unit shown in FIG. 2.

FIG. 6 is an illustrative drawing showing an example of an operation of the communication system shown in FIG. 1.

FIG. 7 is an illustrative drawing showing an example of an operation of the communication system shown in FIG. 1.

FIG. 8 is an illustrative drawing showing an example of an operation of the communication system shown in FIG. 1.

FIG. 9 is an illustrative drawing showing an example of an operation of the communication system shown in FIG. 1.

DESCRIPTION OF EMBODIMENTS

Figure 1:
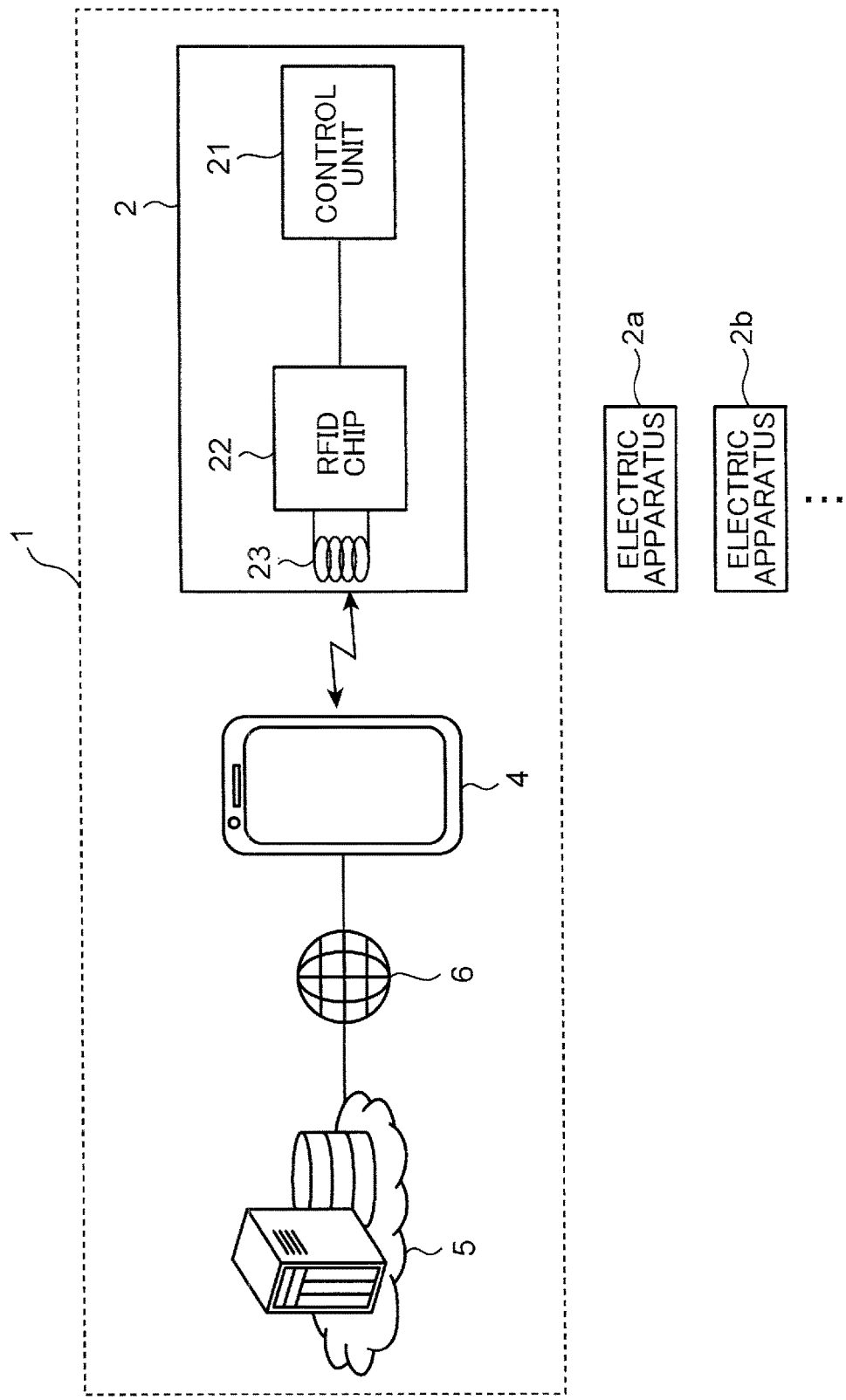
FIG. 1 is a block diagram showing an overall configuration of a communication system according to an embodiment of the present invention.

Hereinafter, an embodiment of the present invention will be described with reference to the drawings. It should be noted that components denoted by the same symbols in the respective drawings represent the same component, in which case a description thereof will be omitted. FIG. 1 is a block diagram showing an overall configuration of a communication system according to an embodiment of the present invention. A communication system 1 shown in FIG. 1 includes an electric appliance 2, a portable terminal device 4, and a server device 5. The portable terminal device 4 is connected so as to be capable of communicating with the server device 5 via a network 6.

For example, the electric appliance 2 may be any of biological information measurement devices such as a weight scale, a body fat scale, and a sphygmomanometer, measurement devices such as a data logger which measures and records temperature, humidity, and other environmental information, a television set, a refrigerator, a washing machine, a microwave oven, and other various electric appliances. The electric appliance 2 is configured so as to be capable of communicating with the portable terminal device 4 by, for example, near field communication (NFC). The electric appliance 2 mainly includes, for example, a control unit 21, a radio frequency identification (RFID) chip 22, and a loop antenna 23. The network 6 is a communication network such as the Internet, a telephone line, and a mobile communication network.

In addition, various electric appliances 2a, 2b (other electric appliances) and the like which include the control unit 21, the RFID chip 22, and the loop antenna 23 in a same manner as the electric appliance 2 and which are capable of communicating with the portable terminal device 4 are commercially available or installed in a home of a user. The electric appliances 2a and 2b represent an example of other electric appliances. For example, the electric appliances 2a and 2b may be electric appliances of a different type from the electric appliance 2 or may be electric appliances that are different models of the same type as the electric appliance 2. The communication system 1 may include the electric appliances 2a and 2b.

The portable terminal device 4 is a communication device that can be carried by the user such as a mobile phone. The server device 5 is, for example, a computer of a data center that is installed at a remote location or a computer that is managed by a communication provider, a service provider, or the like.

Figure 2:
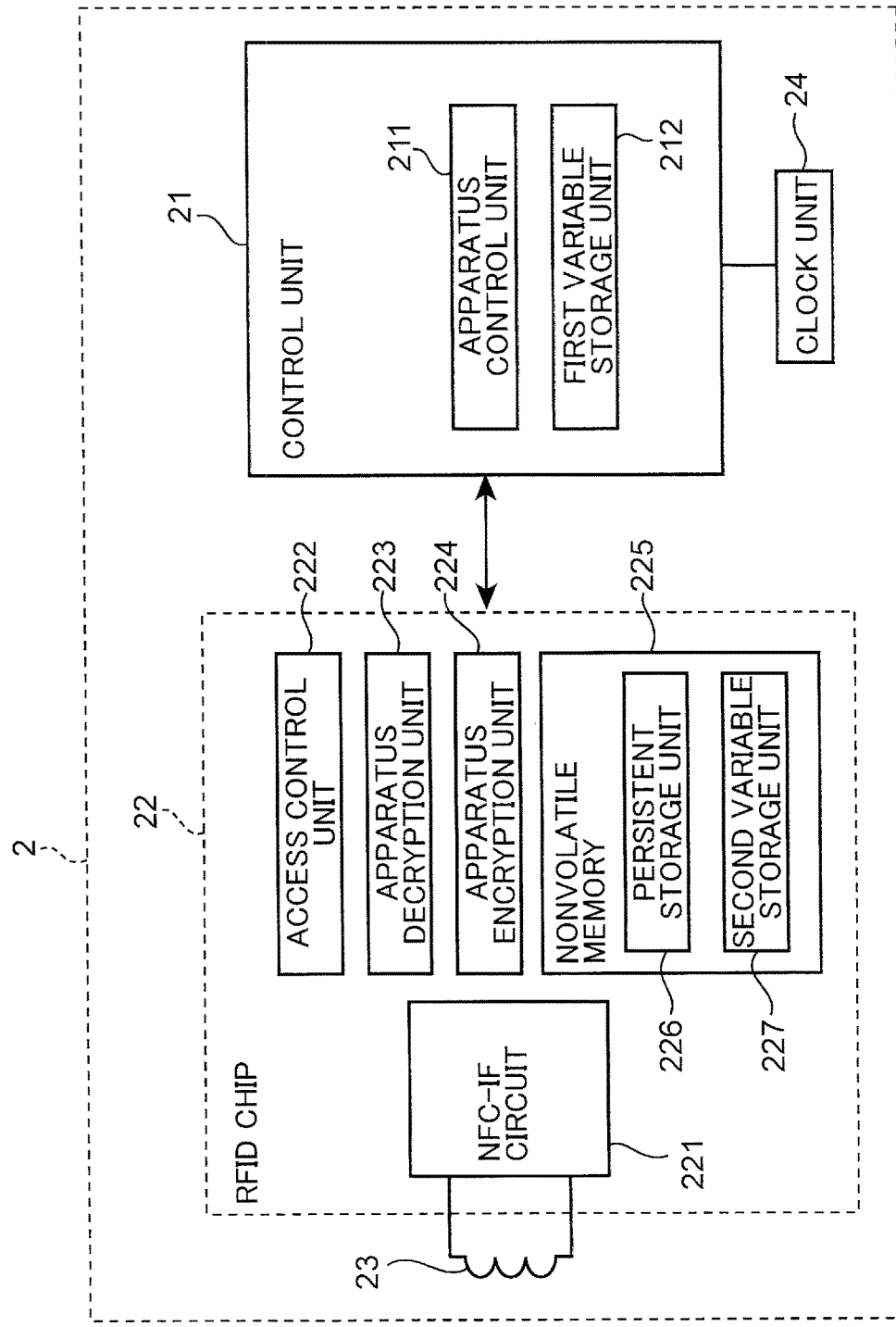
FIG. 2 is a block diagram showing an example of a detailed configuration of an electric appliance shown in FIG. 1.
Figure 3:
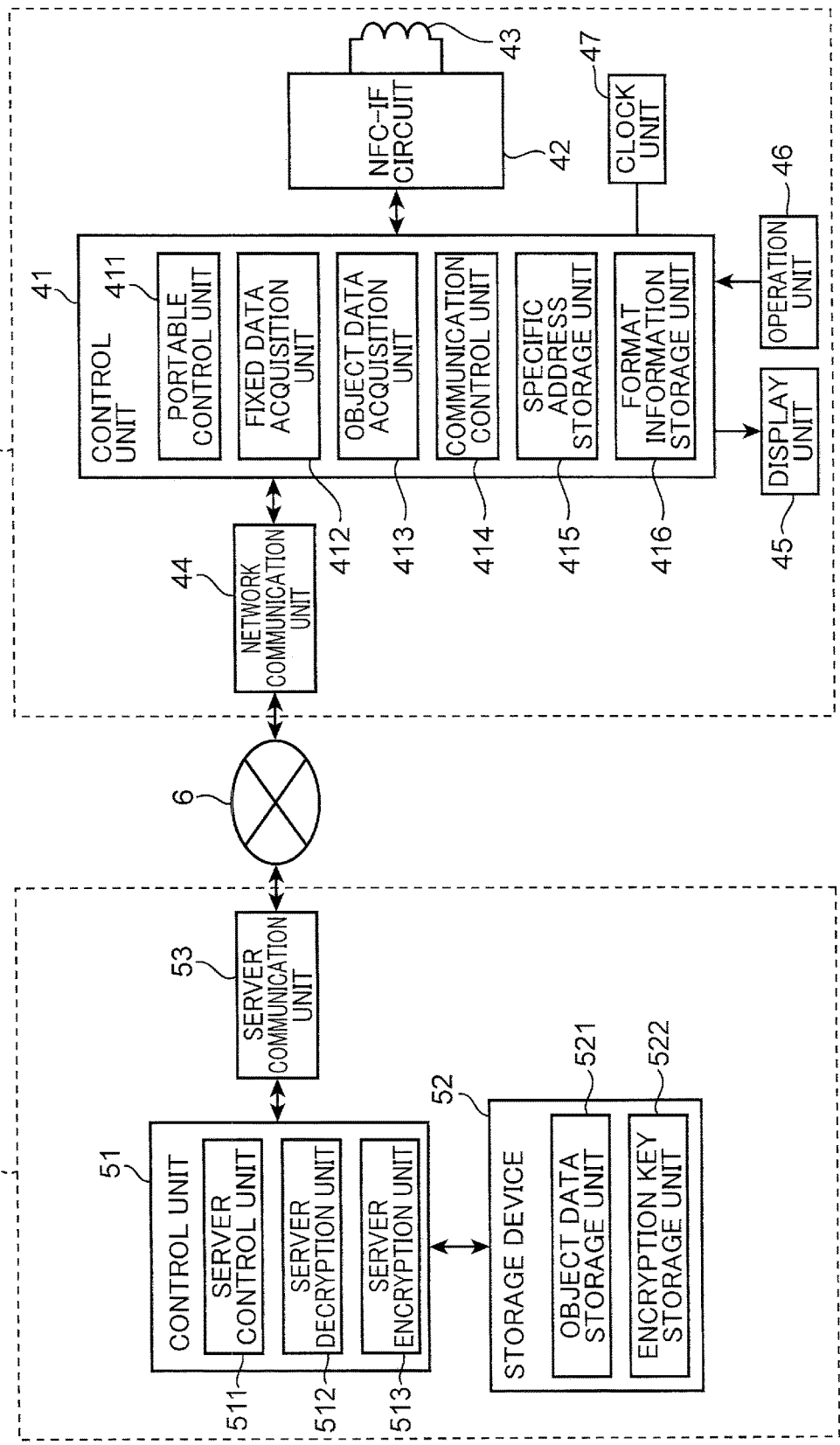
FIG. 3 is a block diagram showing an example of a detailed configuration of a portable terminal device and a server device shown in FIG. 1.

FIG. 2 is a block diagram showing an example of a detailed configuration of the electric appliance 2 shown in FIG. 1. FIG. 3 is a block diagram showing an example of a detailed configuration of the portable terminal device 4 and the server device 5 shown in FIG. 1. The electric appliance 2 shown in FIG. 2 includes the control unit 21, the RFID chip 22, the loop antenna 23, and a clock unit 24. The RFID chip 22 is, for example, an integrated circuit for RDID that is used in an RFID tag.

The RFID chip 22 includes a near field communication-interface (NFC-IF) circuit 221 (an example of the apparatus communication unit), an access control unit 222, an apparatus decryption unit 223, an apparatus encryption unit 224, a nonvolatile memory 225, and a communication IF circuit (not shown) that performs serial communication with the control unit 21. The nonvolatile memory 225 includes a fixed data storage unit 226 and a second variable data storage unit 227. As the nonvolatile memory 225, for example, various storage elements such as a ferroelectric random access memory (FeRAM) and a flash memory can be used.

The fixed data storage unit 226 is disposed at a specific address (for example, Addr1 to Addr8) set in advance and stores at least setting address information (to be described later). The specific address is the same among the electric appliances 2, 2a, and 2b. In addition, the fixed data storage unit 226 stores a format number (an example of format identification information) to be described later.

The clock unit 24 is a timer circuit that measures a current date/time and time. For example, a real time clock (RTC) is used as the clock unit 24.

For example, the control unit 21 includes a central processing unit (CPU) that executes predetermined arithmetic processes, a nonvolatile read only memory (ROM) storing a predetermined control program, a random access memory (RAM) that temporarily stores data, a communication interface (IF) circuit (not shown) that performs serial communication with the RFID chip 22, a first variable data storage unit 212 constituted by a rewriteable nonvolatile storage element such as an electrically erasable and programmable read only memory (EEPROM) and an FeRAM or by a volatile RAM, and peripheral circuits thereof. For example, the control unit 21 constitutes an apparatus control unit 211 by executing a control program stored in the ROM.

The apparatus control unit 211 acquires data related to the electric appliance 2 and causes the first variable data storage unit 212 to store the data. For example, when the electric appliance 2 is a refrigerator, the apparatus control unit 211 acquires data representing a measured value of internal temperature of the refrigerator, the number of times a refrigerator door has been opened and closed from a thermometer or a door open/close switch (not shown), or the like and causes the first variable data storage unit 212 to store the data.

In addition, the apparatus control unit 211 causes information indicating a storage area where the first variable data storage unit 212 had stored data such as a head address (for example, Addr10) and a data amount (for example, 3 blocks) of the storage area to be stored at a predetermined address (Addr4 in FIG. 5A) of the fixed data storage unit 226 as setting address information. At this point, the apparatus control unit 211 calculates a checksum of the setting address information and causes the fixed data storage unit 266 to store the checksum as well.

A checksum is an example of an error detection code. An error detection code is not limited to a checksum and various error detection codes and data can be used. For example, a cyclic redundancy check (CRC) or a code or data capable of error correction may be used in place of a checksum.

The access control unit 222 accesses the fixed data storage unit 226, the first variable data storage unit 212, and the second variable data storage unit 227 in response to a request received by the NFC-IF circuit 221 and reads data from an address specified in the request. The access control unit 222 causes the NFC-IF circuit 221 to transmit the read data to the portable terminal device 4. It should be noted that, in the present specification, "requests" that are transmitted or received through communication signify signals indicating respective request contents.

When the read request received by the NFC-IF circuit 221 is a read request of the first variable data storage unit 212, the access control unit 222 specifies the address specified by the read request and issues a request to the apparatus control unit 211 to read the first variable data storage unit 212, indirectly accesses the first variable data storage unit 212 by acquiring data read by the apparatus control unit 211, and reads object data from the first variable data storage unit 212. The access control unit 222 causes the apparatus encryption unit 224 to encrypt the object data and causes the NFC-IF circuit 221 to transmit the encrypted object data to the portable terminal device 4.

The apparatus decryption unit 223 decrypts a control instruction received by the NFC-IF circuit 221.

The apparatus encryption unit 224 encrypts object data. As an encryption method, the apparatus encryption unit 224 can use various encryption methods such as the Data Encryption Standard (DES) and the Advanced Encryption Standard (AES).

The portable terminal device 4 shown in FIG. 3 includes a control unit 41, an NFC-IF circuit 42 (an example of the portable communication unit), a loop antenna 43, a network communication unit 44, a display unit 45, and an operation unit 46.

With reference to FIGS. 2 and 3, the loop antenna 23 is connected to the NFC-IF circuit 221 and the loop antenna 43 is connected to the NFC-IF circuit 42. The loop antennas 23 and 43 are antennas for performing near-field wireless communication. For near-field wireless communication, for example, various frequency bands can be used including a high frequency band such as the 13.56 MHz band, a UHF band ranging from 90 MHz to 1 GHz, and a frequency band exceeding 2 GHz.

The NFC-IF circuits 221 and 42 are communication circuits that perform near-field wireless communication with each other via the loop antennas 23 and 43. The NFC-IF circuits 221 and 42 can execute near-field wireless communication according to, for example, communication specifications standardized as ISO/IEC21481 (NFC IP-2).

Since near-field wireless communication has a short communicable reference distance of, for example, around 10 cm, the loop antennas 23 and 43 must be brought close to each other in order to execute near-field wireless communication. In consideration thereof, for example, a mark indicating a position of a loop antenna is imprinted on the housings of the electric appliance 2 and the portable terminal device 4. A user executes near-field wireless communication between the electric appliance 2 and the portable terminal device 4 by bringing the marks on the electric appliance 2 and the portable terminal device 4 close to or in contact with each other. Hereinafter, it is assumed that an act of touching includes an act of bringing the electric appliance 2 and the portable terminal device 4 within a distance that enables near-field wireless communication.

Since the electric appliance 2 and the portable terminal device 4 are not always disposed close to each other, the performance of touching must be detected to enable the NFC-IF circuits 221 and 42 to execute near-field wireless communication. In addition, since the user touches an unspecified electric appliance 2 using an unspecified portable terminal device 4, in order to realize communication between the electric appliance 2 and the portable terminal device 4, the electric appliance 2 and the portable terminal device 4 must respectively recognize the presence of a communication partner when touched.

In consideration thereof, for example, the NFC-IF circuit 221 periodically transmits a polling command. When the portable terminal device 4 (the loop antenna 43) is present within a distance that enables near-field wireless communication from the electric appliance 2 (the loop antenna 23) upon execution of the polling command, the NFC-IF circuit 42 recognizes the presence of the electric appliance 2 by receiving the polling command and transmits a response command to the electric appliance 2 in response to the polling. The NFC-IF circuit 221 recognizes the presence of the portable terminal device 4 by receiving the response command. In this manner, near-field wireless communication can be executed between the NFC-IF circuits 221 and 42 as the NFC-IF circuits 221 and 42 recognize each other's presence.

Creating a state where the electric appliance 2 (the NFC-IF circuit 221) and the portable terminal device 4 (the NFC-IF circuit 42) recognize each other's presence and are capable of communicating with each other as described above will be referred to as establishing communication. A method of establishing communication is not necessarily limited to a method involving polling and responding as described above. Establishing communication refers to creating a state where the electric appliance 2 and the portable terminal device 4 are capable of communicating with each other regardless of the method employed to establish communication.

When communication is successfully established, the NFC-IF circuit 221 notifies the control unit 21 that communication has been successfully established. When communication is successfully established, the NFC-IF circuit 42 notifies the control unit 41 that communication has been successfully established.

Moreover, a polling command may be arranged to be transmitted from the NFC-IF circuit 42 or response commands may be arranged to be transmitted from both NFC-IF circuits 221 and 42. In addition, while an example has been shown where the NFC-IF circuit 221 that is the apparatus communication unit and the NFC-IF circuit 42 that is the portable communication unit perform near-field wireless communication, communication between the apparatus communication unit and the portable communication unit is not limited to near-field wireless communication and may be based on other communication methods.

However, when the NFC-IF circuits 221 and 42 perform near-field wireless communication, since communication is established between the electric appliance 2 and the portable terminal device 4 by a physical and intuitive operation by the user involving touching the electric appliance 2 with the portable terminal device 4 as described above, user convenience is improved. In addition, since the NFC-IF circuits 221 and 42 can recognize that the user has touched the electric appliance 2 with the portable terminal device 4 upon the successful establishment of communication, a process corresponding to an operation involving touching by the user can be readily executed using the touching operation as a trigger.

In addition, when the NFC-IF circuits 221 and 42 perform near-field wireless communication, the user is capable of touching a large number of unspecified electric appliances such as the electric appliances 2, 2a, and 2b with the portable terminal device 4 without any restrictions. Since the electric appliances 2, 2a, and 2b may be of different types or different models, it is highly likely that addresses where data to be read is stored differ from one another. Therefore, when the NFC-IF circuits 221 and 42 perform near-field wireless communication, every time the user touches an electric appliance, an address where data to be read is stored must be specified with respect to an electric appliance that is a communication object.

The network communication unit 44 is a communication circuit that performs, for example, wireless mobile communication. The network communication unit 44 performs data transmission/reception with the server device 5 via the network 6. When the network communication unit 44 accesses the network 6 using wireless mobile communication, the network communication unit 44 is connected to the Internet by a mobile communication provider. Accordingly, the network communication unit 44 is capable of communicating with the server device 5 that is connected to the Internet.

The display unit 45 is a display device such as a liquid crystal display and an organic EL display. The operation unit 46 is an operation input device such as a key switch and a touch panel. The display unit 45 and the operation unit 46 are connected to the control unit 41. Moreover, the display unit 45 and the operation unit 46 may be an operation panel in which a display panel and a touch panel are integrally configured.

The clock unit 47 is configured in a similar manner to the clock unit 24.

The control unit 41 includes, for example, a CPU that executes predetermined arithmetic processes, a nonvolatile ROM storing a predetermined control program, a RAM that temporarily stores data, a specific address storage unit 415 and a format information storage unit 416 constituted by a rewriteable nonvolatile storage element such as an EEPROM and an FeRAM or by a volatile RAM, and peripheral circuits thereof. For example, by executing a control program stored in the ROM, the control unit 41 constitutes a portable control unit 411, a fixed data acquisition unit 412, an object data acquisition unit 413, and a communication control unit 414. The control program may be downloaded via a network.

A specific address (for example, Addr1 to Addr8) where the fixed data storage unit 226 is disposed is stored in advance in the specific address storage unit 415.

Respective pieces of format information corresponding to the electric appliances 2, 2a, and 2b are stored in advance in association with format numbers in the format information storage unit 416. Format information is information indicating contents (meaning) of information stored in the fixed data storage unit 226 and a position (address) where the information is disposed.

FIGS. 4A and 4B are illustrative drawings showing examples of format information that is stored in the format information storage unit 416 shown in FIG. 3. For example, the format information shown in FIG. 4A is format information corresponding to the electric appliance 2 and has a format number of 1. With the format information shown in FIG. 4A, "1" is stored as a format number at address Addr1 to indicate format information with a format number of 1. FIG. 4A also shows that data at address Addr2 is a key number, data at Addr3 is an item number of the electric appliance, data at Addr4 indicates a start address and a data amount of object data A to be read from the electric appliance, data at Addr5 indicates a start address and a data amount of object data B to be read from the electric appliance, data at Addr6 represents a first variable data storage unit access disabled flag that indicates whether or not access by the access control unit 222 to the first variable data storage unit 212 is to be disabled, data at Addr7 represents a time setting flag for requesting clock adjustment of the electric appliance 2 by the portable terminal device 4, and address Addr8 is a control instruction write address for writing a control instruction to be executed by the electric appliance 2.

For example, the format information shown in FIG. 4B is format information corresponding to the electric appliance 2a and has a format number of 2. With the format information shown in FIG. 4B, "2" is stored as a format number at address Addr1 to indicate format information with a format number of 2. Addresses Addr2 to Addr5 and Addr8 are similar to those shown in FIG. 4A. The example of the format information whose format number is 2 differs from the format information whose format number is 1 in that data at Addr6 indicates a start address and a data amount of object data C to be read from the electric appliance and Addr7 indicates a start address and a data amount of object data D to be read from the electric appliance.

As shown, a plurality of pieces of format information corresponding to a plurality of electric appliances are stored in the format information storage unit 416. Hereinafter, format information with a format number of 1 will be simply referred to as format 1 and format information with a format number of 2 will be simply referred to as format 2.

The portable control unit 411 executes an application program that is stored in, for example, the RAM.

The fixed data acquisition unit 412 reads a specific address that is stored in the specific address storage unit 415. In addition, by causing the NFC-IF circuit 42 to specify a specific address and transmit a read request with respect to the fixed data storage unit 226 to the NFC-IF circuit 221, the fixed data acquisition unit 412 causes the NFC-IF circuit 221 to transmit fixed data as read data and acquires the fixed data.

The object data acquisition unit 413 acquires setting address information included in the fixed data acquired by the fixed data acquisition unit 412. Subsequently, the object data acquisition unit 413 specifies an address area (setting storage area) corresponding to, for example, 3 blocks from Addr10 as indicated by the acquired setting address information, causes the NFC-IF circuit 221 to transmit object data by causing the NFC-IF circuit 42 to transmit a read request with respect to the first variable data storage unit 212 or the second variable data storage unit 227 to the NFC-IF circuit 221, and acquires the object data.

Hereinafter, for brevity of description, the portable terminal device 4 (or a component thereof) causing the NFC-IF circuit 42 to transmit data to the NFC-IF circuit 221 will be simply described as the portable terminal device 4 (or a component thereof) transmitting data to the electric appliance 2 (or a component thereof), and the access control unit 222 causing the NFC-IF circuit 221 to transmit data to the NFC-IF circuit 42 will be simply described as the electric appliance 2 (or a component thereof) transmitting data to the portable terminal device 4 (or a component thereof).

The communication control unit 414 causes the network communication unit 44 to transmit the object data acquired by the object data acquisition unit 413 to the server communication unit 53 via the network 6. Hereinafter, for brevity of description, the portable terminal device 4 (or a component thereof) causing the network communication unit 44 to transmit data to the server communication unit 53 via the network 6 will be simply described as the portable terminal device 4 (or a component thereof) transmitting data to the server device 5 (or a component thereof), and the server device 5 (or a component thereof) causing the server communication unit 53 to transmit data to the network communication unit 44 via the network 6 will be simply described as the server device 5 (or a component thereof) transmitting data to the portable terminal device 4 (or a component thereof).

The server device 5 shown in FIG. 3 includes a control unit 51, a storage device 52, and the server communication unit 53. The control unit 51 includes, for example, a CPU that executes predetermined arithmetic processes, a RAM that temporarily stores data, and peripheral circuits thereof. For example, by executing a control program stored in the storage device 52, the control unit 51 constitutes a server control unit 511, a server decryption unit 512, and a server encryption unit 513.

The storage device 52 is constituted by, for example, a hard disk drive (HDD) device or various storage devices and storage elements such as an EEPROM and an FeRAM. The storage device 52 constitutes an object data storage unit 521 and an encryption key storage unit 522.

The object data storage unit 521 stores object data received by the server communication unit 53 from the portable terminal device 4. The encryption key storage unit 522 stores, in advance, a plurality of encryption keys to be used to decrypt codes in association with key numbers (an example of key identification information) that identify the respective encryption keys.

The server communication unit 53 is a communication interface circuit to, for example, the Ethernet (registered trademark). The server communication unit 53 is connected to the network communication unit 44 via the network 6 so as to be capable of transmitting and receiving data. In addition, the server communication unit 53 is connected to the control unit 51.

The server decryption unit 512 acquires an encryption key that is stored in the encryption key storage unit 522 in association with a key number received by the server communication unit 53. In addition, when encrypted object data is received by the server communication unit 53, the server decryption unit 512 decrypts the encrypted object data using the acquired encryption key and causes the object data storage unit 521 to store the decrypted object data.

The server encryption unit 513 encrypts a control instruction.

Next, an example of an operation by the communication system 1 that is configured as described above will be described. First, the apparatus control unit 211 stores setting address information in the fixed data storage unit 226. FIG. 5A is an illustrative drawing showing an example of fixed data that is stored in the fixed data storage unit 226 shown in FIG. 2.

The fixed data shown in FIG. 5A is stored in a storage area at a specific address Addr1 to Addr8 in the fixed data storage unit 226. The fixed data shown in FIG. 5A corresponds to format 1 shown in FIG. 4A.

Specifically, in correspondence to format 1, "1" that is a format number is stored at address Addr1, "2" is stored as a key number at address Addr2, an item number of the electric appliance is stored at address Addr3, Addr10 that is a start address and "3 blocks" that is a data amount of object data A stored in, for example, the first variable data storage unit 212 is stored as setting address information at address Addr4, and Addr11 that is a start address and "2 blocks" that is a data amount of object data B stored in, for example, the second variable data storage unit 212 is stored as setting address information at address Addr5.

The data amount expresses an amount of data by the number of blocks on the assumption that 1 block represents an amount of data stored at 1 address. Moreover, the data amount of 1 block may be arbitrarily set to 1 byte, 1 word, 16 bytes, and the like.

A first variable data storage unit access disabled flag is stored as being turned off (0) at address Addr6. This means that access to the first variable data storage unit 212 by the access control unit 222 is enabled. Specifically, due to the first variable data storage unit access disabled flag being turned off, execution of a tunnel mode is enabled where, in response to the portable terminal device 4 issuing a read request with respect to the first variable data storage unit 212 to the access control unit 222, the access control unit 222 indirectly reads data from the first variable data storage unit 212 via the apparatus control unit 211 and transmits variable data to the portable terminal device 4.

A time setting flag at address Addr7 is turned on (1). This means that time adjustment (time setting) of the clock unit 47 is being requested by the portable terminal device 4. In addition, a control instruction write address of Addr15 is stored at address Addr8.

In addition, checksums respectively corresponding to the specific address Addr1 to Addr8 are stored in the fixed data storage unit 226.

With the exception of setting address information stored by the apparatus control unit 211 at addresses Addr4 and Addr5, other data is stored in advance in the fixed data storage unit 226 upon, for example, shipment of the electric appliance 2 from the factory. Alternatively, a configuration may be adopted in which the setting address information at addresses Addr4 and Addr5 is also stored in advance in the fixed data storage unit 226 upon shipment from the factory or a configuration may be adopted in which data other than that at addresses Addr4 and Addr5 is also stored by the apparatus control unit 211.

FIG. 5B is an illustrative drawing showing an example of fixed data corresponding to format 2.

FIGS. 6 to 9 are illustrative drawings showing examples of an operation of the communication system 1 shown in FIG. 1. First, the portable control unit 411 of the portable terminal device 4 starts an application for reading data from the electric appliance 2 or controlling the electric appliance 2 (step S1). At this point, the operation unit 46 accepts a start instruction of the application by the user. The portable control unit 411 starts the application according to the accepted start instruction.

Next, the portable control unit 411 causes the display unit 45 to display a touch instruction screen for instructing the user to perform a touching operation involving bringing the portable terminal device 4 close to the electric appliance 2 (step S2). Subsequently, as the user performs the touching operation, a short-range wireless communication establishing process is executed by the NFC-IF circuits 221 and 42 (step S3) and the electric appliance 2 and the portable terminal device 4 are placed in a communicable state.

Next, the fixed data acquisition unit 412 reads a specific address (for example, Addr1 to Addr8) that is stored in the specific address storage unit 415. In addition, the fixed data acquisition unit 412 specifies the specific address (for example, Addr1 to Addr8) and transmits a read request with respect to the fixed data storage unit 226 to the RFID chip 22 (step S4).

As a result, the access control unit 222 reads fixed data stored at, for example, the addresses Addr1 to Addr8 shown in FIG. 5A from the fixed data storage unit 226 and transmits the fixed data to the portable terminal device 4 (step S5). Accordingly, for example, the fixed data shown in FIG. 5A is received by the NFC-IF circuit 42 and the received fixed data is acquired by the fixed data acquisition unit 412. The access control unit 222 does not encrypt fixed data stored in the fixed data storage unit 226.

Upon acquiring the fixed data, the fixed data acquisition unit 412 calculates a checksum of each block included in the fixed data and collates the calculated checksum with a checksum included in the fixed data. Subsequently, when the calculated checksum and the checksum included in the fixed data coincide with each other, the fixed data acquisition unit 412 determines that the fixed data is normal. On the other hand, when the calculated checksum and the checksum included in the fixed data do not coincide with each other, the fixed data acquisition unit 412 determines that the fixed data is not normal and, for example, repeats steps S4 and S5.

As described above, by including a checksum in fixed data and having the fixed data acquisition unit 412 perform collation of checksums, reliability of the fixed data is improved.

Next, the object data acquisition unit 413 refers to the fixed data (FIG. 5A) acquired by the fixed data acquisition unit 412 and confirms the format number of address Addr1. In the example shown in FIG. 5A, since the format number is 1, reference is made to format 1 (FIG. 4A) that is stored in the format information storage unit 416. Accordingly, setting address information indicates addresses Addr4 and Addr5. Therefore, the object data acquisition unit 413 first acquires a start address "Addr10" and a data amount "3 blocks" of the object data A as setting address information from address Addr4 of the fixed data (FIG. 5A) acquired by the fixed data acquisition unit 412. In this case, address Addr10 corresponds to, for example, an address in the second variable data storage unit 227.

As described above, the object data acquisition unit 413 acquires setting address information from fixed data on the basis of format information. Therefore, for example, when desiring to change a disposed position or the number of pieces of setting address information disposed in fixed data such as when desiring to increase the number of pieces of setting address information in accordance with specifications of an electric appliance as shown in FIG. 5B, a disposed position or the number of pieces of setting address information can be changed by simply changing a format number included in fixed data to be stored in the fixed data storage unit 226. As a result, association of contents of fixed data can be performed in a flexible manner in accordance with specifications of an electric appliance.

In addition, even when fix data includes information including a control flag such as the first variable data storage unit access disabled flag and the time setting flag shown in FIG. 5A and a control instruction write address, by arranging such information to be acquired from fixed data on the basis of format information, various information can be included in fixed data in a flexible manner in accordance with specifications of an electric appliance.

In addition, in accordance with the acquired setting address information, the object data acquisition unit 413 specifies address Addr10 and a data amount of 3 blocks and issues a request to the RFID chip 22 to read the variable data storage unit (step S6).

As a result, the NFC-IF circuit 221 receives a read request specifying address Addr10 and a data amount of 3 blocks. Subsequently, the access control unit 222 confirms that address Addr10 is an address in the second variable data storage unit 227 and reads object data A corresponding to 3 blocks from address Addr10 in the second variable data storage unit 227.

For example, a serial number, error history information, and the like of the electric appliance 2 are stored as the object data A in the second variable data storage unit 227.

The access control unit 222 causes the apparatus decryption unit 223 to encrypt object data stored in the first variable data storage unit 212 and the second variable data storage unit 227 and transmits the encrypted object data A to the portable terminal device 4 (step S7). The object data A is received by the NFC-IF circuit 42 of the portable terminal device 4 and the encrypted object data A is acquired by the object data acquisition unit 413.

As described above, due to the processes performed in steps S4 to S7, even when object data is stored at addresses that differ from each other among the electric appliances 2, 2a, and 2b, the fixed data acquisition unit 412 can acquire setting address information indicating an address where object data is stored using a read request specifying the same specific address with respect to any of the electric appliances 2, 2a, and 2b. Subsequently, by issuing a request with respect to object data to the electric appliances 2, 2a, and 2b on the basis of the setting address information, the object data acquisition unit 413 can acquire the object data.

Therefore, even when there are a plurality of electric appliances storing object data at addresses that differ from each other, data stored in each electric appliance can be readily read to the outside of the electric appliance by specifying an address.

With reference to FIG. 7, the object data acquisition unit 413 next acquires a start address "Addr11" and a data amount "2 blocks" of the object data B as setting address information from address Addr5 of the fixed data (FIG. 5A) acquired by the fixed data acquisition unit 412. In this case, address Addr11 corresponds to, for example, an address in the first variable data storage unit 212.

In addition, in accordance with the acquired setting address information, the object data acquisition unit 413 specifies address Addr11 and a data amount of 2 blocks and issues a request to the RFID chip 22 to read the variable data storage unit (step S11).

As a result, the NFC-IF circuit 221 receives a read request specifying address Addr11 and a data amount of 2 blocks. The access control unit 222 confirms that address Addr11 is an address in the first variable data storage unit 212 and issues a request to the apparatus control unit 211 to read object data corresponding to 2 blocks from address Addr11 in the first variable data storage unit 212 (step S12).

Subsequently, the apparatus control unit 211 reads object data B corresponding to 2 blocks from address Addr11 in the first variable data storage unit 212 and the object data B is transmitted to the access control unit 222 (step S13). For example, the number of times the refrigerator door had been opened and closed over a period of one month is stored as object data B in the first variable data storage unit 212.

The access control unit 222 causes the apparatus decryption unit 223 to encrypt object data stored in the first variable data storage unit 212 and transmits the encrypted object data B to the portable terminal device 4 (step S14). The object data B is received by the NFC-IF circuit 42 of the portable terminal device 4 and the encrypted object data B is acquired by the object data acquisition unit 413.

As described above, due to the processes performed in steps S11 to S14, even when object data is not built into the RFID chip 22 and is stored in the first variable data storage unit 212 that cannot be directly accessed by the access control unit 222, the object data can be readily read to the outside of an electric appliance by specifying an address of each electric appliance.

In addition, by having the fixed data storage unit 226 store setting address information, the apparatus control unit 211 can change setting address information in accordance with the amount and address disposition of data stored in the first variable data storage unit 212 and the second variable data storage unit 227. As a result, the data amount and the address disposition of object data can be changed in a flexible manner.

Next, the portable control unit 411 refers to format 1 (FIG. 4A) stored in the format information storage unit 416, and upon confirming that address Addr7 is a time setting flag, refers to address Addr7 of the fixed data (FIG. 5A) acquired by the fixed data acquisition unit 412. When the time setting flag is turned on (1), the portable control unit 411 transmits a current date/time and time information as measured by the clock unit 47 to the RFID chip 22 and issues a request with respect to time setting (step S15). As a result, the time information and the time setting request are accepted by the access control unit 222.

Based on the accepted time information, the access control unit 222 causes the apparatus control unit 211 to perform time adjustment of the clock unit 24 (step S16). Subsequently, when time setting is completed, the apparatus control unit 211 notifies the access control unit 222 that time setting has been completed (step S17).

The access control unit 222 notifies the portable terminal device 4 that time setting has been completed (step S18).

Next, the communication control unit 414 of the portable terminal device 4 refers to format 1 (FIG. 4A) stored in the format information storage unit 416, and upon confirming that address Addr2 is a key number, acquires a key number from address Addr2 of the fixed data (FIG. 5A) acquired by the fixed data acquisition unit 412. Subsequently, the communication control unit 414 transmits the key number to the server device 5 (step S19).

In addition, the communication control unit 414 transmits the encrypted object data A and B acquired by the object data acquisition unit 413 to the server device 5 (step S20).

With reference to FIG. 8, in the server device 5, the key number and the encrypted object data A and B received by the server communication unit 53 are acquired by the server control unit 511. The server control unit 511 outputs the key number and the object data A and B to the server decryption unit 512. The server decryption unit 512 refers to the encryption key storage unit 522 and decrypts the object data A and B using an encryption key that is stored in the encryption key storage unit 522 in association with the key number that had been received by the server communication unit 53 (step S31).

As described above, due to the electric appliance 2 including the apparatus encryption unit 224 and the server device 5 including the server decryption unit 512, the object data A and B are received by the portable terminal device 4 in an encrypted state and transmitted to the server device 5 while still being encrypted. For example, when a mobile phone that is provided by a mobile phone provider is used as the portable terminal device 4, it is difficult to ensure security of data inputted to the portable terminal device 4. In addition, object data A and B are data related to the electric appliance 2 and may include information regarding personal information of the user. In consideration thereof, the communication system 1 is configured so as to include the apparatus encryption unit 224 and the server decryption unit 512, and the object data A and B are received by the portable terminal device 4 in an encrypted state and transmitted to the server device 5 while still being encrypted. As a result, security of data can be ensured.

Next, the server control unit 511 causes the object data storage unit 521 to store the decrypted object data A and B (step S32). Accordingly, object data stored in the electric appliance 2 can be read to the server device 5 and the server device 5 can provide various services that utilize the object data to the user.

Subsequently, the server control unit 511 analyzes the decrypted object data A and B and generates screen information corresponding to the object data A and B (step S33). For example, the server control unit 511 determines whether or not the serial number of the electric appliance 2 included in the object data A is subject to recall (recovery and repair), and when the serial number is subject to recall, generates screen information (for example, image data to be displayed on a screen) for notifying the user that the electric appliance 2 is subject to recall or informing the user of a contact number of the manufacturer.

Alternatively, for example, when an average value of the number of times the refrigerator door had been opened and closed over a period of one month, which is included in the object data B, is greater than a standard number set in advance, the server control unit 511 generates screen information for a notification screen that informs the user that electricity cost can be saved by reducing the number of times the refrigerator door is opened and closed.

Next, the server control unit 511 transmits the generated screen information to the portable terminal device 4 (step S34). As a result, the screen information is received by the network communication unit 44 of the portable terminal device 4. The portable control unit 411 causes the display unit 45 to display an image based on the received screen information (step S35).

Accordingly, the display screen corresponding to the object data stored in the electric appliance 2 can be displayed on the display unit 45 of the portable terminal device 4.

Alternatively, in the communication system 1, the portable terminal device 4 can be configured so as to function as an operation input device for operating the electric appliance 2. FIG. 9 is an illustrative drawing showing an example of an operation of the communication system 1 when the portable terminal device 4 is used as an operation input device for operating the electric appliance 2.

First, when the user operates the operation unit 46 of the portable terminal device 4 and inputs an operation instruction for the electric appliance 2, the operation instruction accepted by the operation unit 46 is acquired by the communication control unit 414 (step S41). Next, the communication control unit 414 transmits operation instruction information indicating contents of the operation instruction to the server device 5 (step S42).

Figure 10:
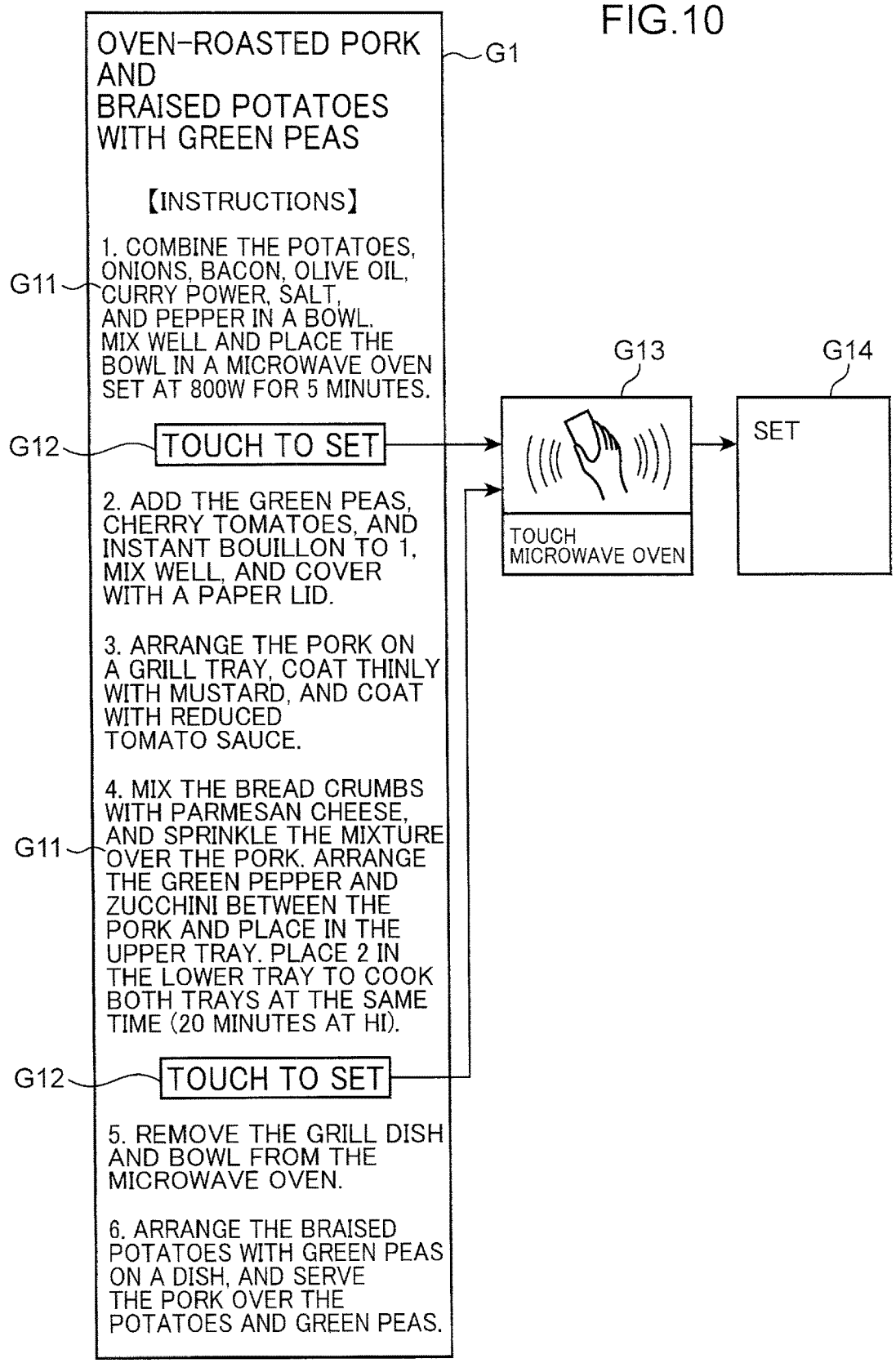
FIG. 10 is an illustrative drawing showing an example of an operation screen that is displayed on a display unit of the portable terminal device when the electric appliance is a microwave oven.

FIG. 10 is an illustrative drawing showing an example of an operation screen that is displayed on the display unit 45 of the portable terminal device 4 when the electric appliance 2 is a microwave oven. For example, the user uses the operation unit 46 to input an operation instruction for causing a cooking recipe screen G1 shown in FIG. 10 to be displayed. As a result, the portable control unit 411 causes the display unit 45 to display the recipe screen G1.

The recipe screen G1 includes a process G11 involving preparation using the electric appliance 2 (a microwave oven). In process G11, setting contents to which the electric appliance 2 is to be set are described as, for example, "5 minutes at 800 W" or "20 minutes at Hi". A "touch to set" image G12 indicating that settings of the process G11 can be automatically set by a "touch" is displayed below where the process G11 is displayed.

The communication control unit 414 transmits operation instruction information indicating that the operation instruction for displaying the recipe screen G1 has been accepted to the server device 5 (step S42).

Figure 11:
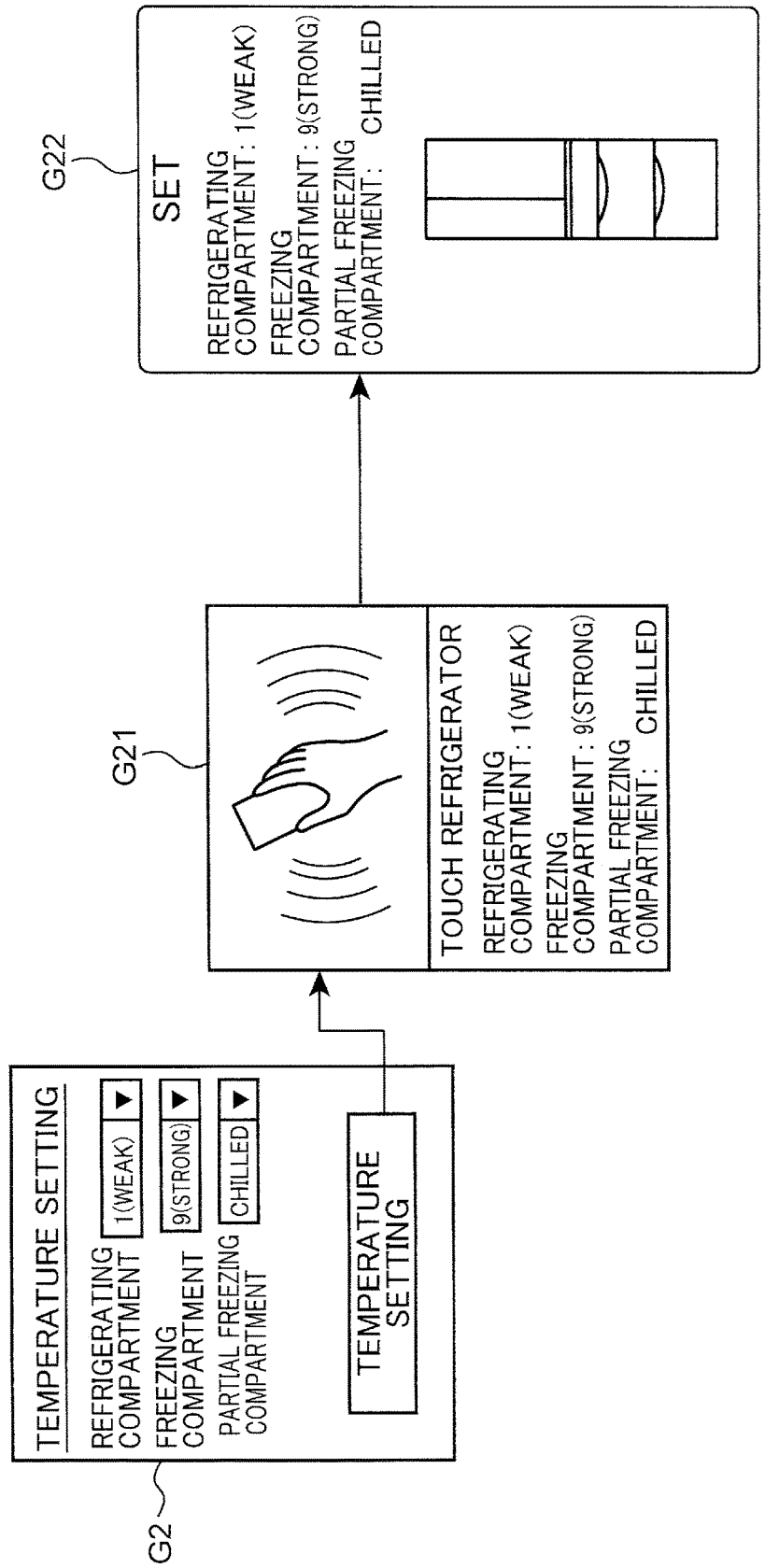
FIG. 11 is an illustrative drawing showing an example of an operation screen that is displayed on a display unit of the portable terminal device when the electric appliance is a refrigerator.

FIG. 11 is an illustrative drawing showing an example of an operation screen that is displayed on the display unit 45 of the portable terminal device 4 when the electric appliance 2 is a refrigerator. For example, the user uses the operation unit 46 to input an operation instruction for causing a temperature setting screen G2 shown in FIG. 11 to be displayed. As a result, the portable control unit 411 causes the display unit 45 to display the temperature setting screen G2.

At this point, the user operates the temperature setting screen G2 to input temperature settings for a refrigerating compartment, a freezing compartment, and a partial freezing compartment and presses a temperature setting button. Accordingly, the temperature settings for the refrigerating compartment, the freezing compartment, and the partial freezing compartment are accepted by the operation unit 46. The communication control unit 414 transmits the temperature settings for the refrigerating compartment, the freezing compartment, and the partial freezing compartment as accepted by the operation unit 46 to the server device 5 as operation instruction information (step S42).

Next, when the operation instruction information is accepted by the server communication unit 53 of the server device 5, the server control unit 511 generates a control instruction corresponding to the operation instruction information and causes the server encryption unit 513 to encrypt the control instruction (step S43). Subsequently, the server control unit 511 transmits the control instruction encrypted by the server encryption unit 513 to the portable terminal device 4 (step S44).

For example, when the electric appliance 2 is a microwave oven, a control instruction is for setting an "automatic menu group: combination technique set/meat and vegetable". For example, when the electric appliance 2 is a refrigerator, a control instruction is for setting temperatures of a refrigerating compartment, a freezing compartment, and a partial freezing compartment.

When an encrypted control instruction is received by the network communication unit 44 of the portable terminal device 4, the portable control unit 411 causes the display unit 45 to display a touch instruction image (for example, an image G13 shown in FIG. 10 and an image G21 shown in FIG. 11) that prompts the user to touch the screen (step S45).

Next, processes similar to those of steps S3 to S5 described earlier are executed by the portable terminal device 4 and fixed data is acquired by the fixed data acquisition unit 412.

Subsequently, based on the format information stored in the format information storage unit 416, the communication control unit 414 acquires a control instruction write address (for example, Addr15 stored at address Addr8 shown in FIG. 5A) from the fixed data acquired by the fixed data acquisition unit 412. The communication control unit 414 then specifies the control instruction write address and transmits a write request with respect to the encrypted control instruction received by the network communication unit 44 to the electric appliance 2 (step S46).

Next, when the write request with respect to the control instruction is received by the NFC-IF circuit 221 of the electric appliance 2, the access control unit 222 causes the apparatus decryption unit 223 to decrypt the received control instruction.

As described above, due to the server device 5 including the server decryption unit 513 and the electric appliance 2 including the apparatus decryption unit 223, security of a control instruction can be ensured by having the control instruction received by the portable terminal device 4 in an encrypted state and transmitted to the electric appliance 2 while still being encrypted.

In addition, for example, when the specified control instruction write address is an address in the first variable data storage unit 212, the access control unit 222 issues a request to the apparatus control unit 211 to write the decrypted control instruction at the control instruction write address (step S47). Accordingly, the control instruction is stored at the address specified by the control instruction write address in the first variable data storage unit 212 by the apparatus control unit 211.

Next, the apparatus control unit 211 accepts the control instruction stored at the control instruction write address in the first variable data storage unit 212 and sets an operation of the apparatus in accordance with the control instruction (step S48). For example, when the electric appliance 2 is a microwave oven, the apparatus control unit 211 sets an "automatic menu group: combination technique set/meat and vegetable" in accordance with the control instruction. In addition, for example, when the electric appliance 2 is a refrigerator, the apparatus control unit 211 sets temperatures of a refrigerating compartment, a freezing compartment, and a partial freezing compartment in accordance with the control instruction.

Subsequently, the apparatus control unit 211 transmits a response notification indicating that the control instruction has been accepted to the access control unit 222 (step S49).

Next, the access control unit 222 causes the apparatus encryption unit 224 to encrypt the response notification and transmits the encrypted response notification to the portable terminal device 4 (step S50).

Subsequently, in the portable terminal device 4, the communication control unit 414 transmits the encrypted response notification received by the NFC-IF circuit 42 to the server device 5 (step S51). In step S51, the communication control unit 414 transmits the key number included in the fixed data acquired in step S5 together with the response notification to the server device 5.

Next, in the server device 5, the key number and the encrypted response notification received by the server communication unit 53 are acquired by the server control unit 511. The server control unit 511 outputs the key number and the response notification to the server decryption unit 512. The server decryption unit 512 refers to the encryption key storage unit 522 and decrypts the response notification using an encryption key that is stored in the encryption key storage unit 522 in association with the key number received by the server communication unit 53.

As described above, due to the electric appliance 2 including the apparatus encryption unit 224 and the server device 5 including the server decryption unit 512, security of a response notification is ensured by adopting a configuration in which the response notification is received by the portable terminal device 4 in an encrypted state and transmitted to the server device 5 while still being encrypted.

Subsequently, the server control unit 511 analyzes the decrypted response notification and generates screen information corresponding to the response notification (step S52). When the response notification indicates that a control instruction has been accepted, the server control unit 511 generates screen information representing a display screen for notifying that the settings inputted by the user have been accepted.

Next, the server control unit 511 transmits the generated screen information to the portable terminal device 4 (step S53). As a result, the screen information is received by the network communication unit 44 of the portable terminal device 4. The portable control unit 411 causes the display unit 45 to display an image based on the received screen information such as an image G14 shown in FIG. 10 or an image G22 shown in FIG. 11 (step S54).

Accordingly, the user is able to learn that settings of the electric appliance 2 have been completed.

Alternatively, the server device 5 may be configured so as not to include the server encryption unit 513 and not to encrypt a control instruction.

Alternatively, fixed data may not include a control instruction write address and the communication system 1 may not execute the processes of steps S41 to S54.

Alternatively, fixed data may not include a checksum and the fixed data acquisition unit 412 may not confirm whether or not fixed data is normal.

Alternatively, the access control unit 222 may be capable of directly accessing the first variable data storage unit and the RFID chip 22 and the control unit 21 may be integrally constructed. In addition, the RFID chip 22 need not necessarily be an integrated circuit for RFID and may be a circuit provided with similar functions to the RFID chip 22. Furthermore, the variable data storage unit need not include the first variable data storage unit 212 and the second variable data storage unit 227 and may include only one variable data storage unit or three or may include more variable data storage units.

The apparatus control unit 211 may not cause the fixed data storage unit 226 to store setting address information and fixed data. Alternatively, setting address information and fixed data may be stored in advance in the fixed data storage unit 226.

Alternatively, a configuration may be adopted in which the portable terminal device 4 does not include the format information storage unit 416, fixed data does not include format identification information, and a format is used in a fixed manner.

Alternatively, a configuration may be adopted in which fixed data does include key identification information, the communication control unit 414 does not transmit key identification information, and the server device 5 does not include the encryption key storage unit 522. In this case, the server decryption unit 512 may perform decryption using an encryption key acquired by other means or by a method that does not involve the use of an encryption key.

Alternatively, the electric appliance 2 may not include the apparatus encryption unit 224 and the server device 5 may not include the server decryption unit 512.

In other words, a communication system according to an aspect of the present invention comprises: an electric appliance; a portable terminal device which communicates with the electric appliance; and a server device which communicates with the portable terminal device via a network, wherein the electric appliance includes: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, the portable terminal device includes: a portable communication unit which communicates with the apparatus communication unit; a network communication unit which communicates with the server device via the network; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network, and the server device includes: a server communication unit which communicates with the network communication unit.

In addition, an electric appliance according to an aspect of the present invention is an electric appliance capable of communicating with a communication system including a portable terminal device equipped with a network communication unit that communicates using a network and a server device equipped with a server communication unit that communicates with the network communication unit via the network, the electric appliance comprising: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, wherein the portable terminal device is capable of operating as: a portable communication unit which communicates with the apparatus communication unit; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network.

Furthermore, a portable terminal device according to an aspect of the present invention is a portable terminal device which is interposed between an electric appliance and a server device and which enables the electric appliance and the server device to communicate with each other, wherein the server device is capable of operating as a server communication unit which communicates with the portable terminal device via the network, the electric appliance is capable of operating as: a variable data storage unit which includes a setting storage area for storing object data that is data to be transmitted to the server device; a fixed data storage unit which stores fixed data at least including setting address information that indicates an address of the setting storage area at a specific address that is an address where the fixed data is shared with other electric appliances; an apparatus communication unit which communicates with the portable terminal device; and an access control unit which reads data from the variable data storage unit and the fixed data storage unit and which causes the apparatus communication unit to transmit the read data to the portable terminal device, and the portable terminal device comprises: a portable communication unit which communicates with the apparatus communication unit; a network communication unit which communicates with the server device via the network; a specific address storage unit which stores the specific address; a fixed data acquisition unit which acquires the fixed data by causing the portable communication unit to transmit a read request, with respect to the fixed data storage unit, for specifying the specific address to the apparatus communication unit and causing the apparatus communication unit to transmit the fixed data as the read data; an object data acquisition unit which acquires the setting address information included in the fixed data acquired by the fixed data acquisition unit, which causes the portable communication unit to transmit a read request, with respect to the variable data storage unit, for specifying a read address on the basis of the acquired setting address information, to the apparatus communication unit to cause the apparatus communication unit to transmit the object data as the read data, and which acquires the object data from the transmitted read data; and a communication control unit which causes the network communication unit to transmit the object data acquired by the object data acquisition unit to the server device via the network.

According to this configuration, a read request specifying a specific address is transmitted by the fixed data acquisition unit of the portable terminal device and fixed data is acquired from the fixed data storage unit disposed at the specific address in the electric appliance. Since the specific address is an address that is shared among an electric appliance and other electric appliances, regardless of which electric appliance is attempting to read fixed data, the fixed data acquisition unit can specify the same specific address and acquire the fixed data from the electric appliance by storing the specific address in the specific address storage unit in advance. Therefore, the fixed data stored in the electric appliance can be readily read by specifying an address. In addition, fixed data includes setting address information indicating an address of a setting storage area where object data that is data to be transmitted to the server device is stored. The object data acquisition unit of the portable terminal device can cause the apparatus communication unit to transmit object data as read data and acquire the object data from the transmitted read data by acquiring the setting address information included in the fixed data, specifying a read address on the basis of the setting address information, and issue a read request with respect to the variable data storage unit. Therefore, even when addresses where object data is stored differ among a plurality of electric appliances, data stored in the electric appliances can be readily read by specifying an address.

In addition, favorably, the electric appliance further includes an apparatus encryption unit which encrypts the object data, when a read request with respect to the variable data storage unit is received by the apparatus communication unit, the access control unit causes the encryption unit to encrypt read data that is read from a read address specified by the received read request and causes the apparatus communication unit to transmit the encrypted read data to the portable terminal device, the object data acquisition unit acquires the encrypted object data, the communication control unit causes the network communication unit to transmit the encrypted object data to the server device, and the server device further includes a server decryption unit which decrypts the encrypted object data when the encrypted object data is received by the server communication unit.

According to this configuration, object data that is transmitted from the electric appliance to the portable terminal device is transmitted after being encrypted by the encryption unit. In addition, the communication control unit of the portable terminal device transmits the encrypted object data to the server device while the object data is still being encrypted. Furthermore, in the server device, the server decryption unit decrypts the encrypted object data. Therefore, since the object data is placed in an encrypted state in the portable terminal device, security of the object data can be readily ensured even when using a portable terminal device for which security cannot be readily ensured.

Furthermore, favorably, the server device further includes an encryption key storage unit which stores a plurality of encryption keys to be used for decryption of codes in advance in association with key identification information that identifies each of the encryption keys, the fixed data includes key identification information that identifies an encryption key for decrypting the encrypted object data among the plurality of encryption keys, the communication control unit further causes the network communication unit to transmit key identification information included in the fixed data acquired by the fixed data acquisition unit to the server device, and the server decryption unit decrypts the object data using the encryption key stored in the encryption key storage unit in association with the key identification information received by the server communication unit.

According to this configuration, key identification information included in fixed data read from the electric appliance is transmitted from the portable terminal device to the server device. An encryption key and key identification information that identifies the encryption key are stored in the server device in association with each other, and the server decryption unit decrypts the object data using the encryption key stored in the encryption key storage unit in association with the key identification information. Therefore, since an encryption key itself is never transmitted or received by communication, encryption strength can be readily increased. In addition, by using a different encryption key for each electric appliance (product), even if security of one encryption key is breached for any reason, the security breach may be prevented from affecting other electric appliances.

Furthermore, favorably, the portable terminal device further includes a format information storage unit which stores, in advance, a plurality of pieces of format information respectively indicating a meaning of one or a plurality of pieces of information represented by the fixed data and positions, in the fixed data, where the one or the plurality of pieces of information are disposed in association with format identification information that identifies each of the pieces of format information, the fixed data includes the format identification information corresponding to the fixed data itself, and the object data acquisition unit acquires the setting address information from the fixed data acquired by the fixed data acquisition unit on the basis of format information stored in the format information storage unit in association with the format identification information included in the fixed data.

According to this configuration, a meaning of information represented by fixed data and a position where the information is disposed are determined by format information. Such format information is stored in plurality in association with format identification information in the format information storage unit. In addition, the object data acquisition unit acquires setting address information from the fixed data acquired by the fixed data acquisition unit on the basis of format information corresponding to format identification information included in the fixed data. Therefore, by changing format identification information included in fixed data, a meaning of information represented by the fixed data and a position where the information is disposed may be changed at will.

In addition, favorably, the electric appliance further includes an apparatus control unit which causes the variable data storage unit to store the object data, and the apparatus control unit causes the fixed storage unit to store information indicating an address of a storage area, in the variable data storage unit, where the object data is stored as the setting address information.

According to this configuration, since the apparatus control unit can cause the fixed data storage unit to store information indicating an address of a storage area of the variable data storage unit where object data is stored as setting address information, the fixed data storage unit can be caused to store appropriate setting address information in accordance with an address where the object data is actually stored in the variable data storage unit.

Furthermore, favorably, the variable data storage unit includes a first variable data storage unit and a second variable data storage unit, the apparatus control unit causes the first variable data storage unit to store the object data, and when the read request with respect to the variable data storage unit that is received by the apparatus communication unit is a read request with respect to the first variable data storage unit, the access control unit specifies an address specified by the read request and issues a request to the apparatus control unit to read the first variable data storage unit, and indirectly reads the object data from the first variable data storage unit by acquiring data read by the apparatus control unit.

According to this configuration, the variable data storage unit includes a first variable data storage unit and a second variable data storage unit, and even when the first variable data storage unit is managed by the apparatus control unit, the access control unit can indirectly read object data from the first variable data storage unit by specifying an address specified by a read request.

In addition, favorably, when the read request with respect to the variable data storage unit received by the apparatus communication unit is a read request with respect to the second variable data storage unit, the access control unit directly reads object data stored in the second variable data storage unit from the second variable data storage unit.

According to this configuration, when a read request with respect to the second variable data storage unit is issued, since the access control unit directly reads object data from the second variable data storage unit, read of object data can be executed in a speedy manner.

Furthermore, favorably, the fixed data includes an error detection code for confirming whether or not the fixed data itself is normal, and the fixed data acquisition unit determines whether or not the acquired fixed data is normal on the basis of the error detection code included in the fixed data.

According to this configuration, since the fixed data acquisition unit is capable of determining whether or not acquired fixed data is normal on the basis of an error detection code included in the fixed data, reliability of the acquired fixed data increases.

In addition, favorably, the variable data storage unit includes an instruction acceptance area for accepting writing of a control instruction for instructing an operation to the electric appliance, the fixed data includes a control instruction write address indicating an address of the instruction acceptance area, the portable terminal device includes an operation unit which accepts an operation instruction by a user, the communication control unit causes the network communication unit to transmit the operation instruction to the server communication unit when the operation instruction is accepted by the operation unit, the server device further includes a server control unit which performs, when the operation instruction is received by the server communication unit, a control instruction transmission process of generating a control instruction corresponding to the operation instruction and causing the server communication unit to transmit the generated control instruction to the network communication unit, and the communication control unit acquires the control instruction write address included in the fixed data acquired by the fixed data acquisition unit and causes the portable communication unit to transmit the control instruction received by the network communication unit to the apparatus communication unit by specifying the control instruction write address.

According to this configuration, since fixed data includes a control instruction write address indicating an address of the instruction acceptance area for accepting writing of a control instruction for instructing an operation to the electric appliance, even when control instruction write addresses differ among a plurality of electric appliances, a control instruction write address corresponding to each electric appliance can be acquired. As a result, even when control instruction write addresses differ among a plurality of electric appliances, a control instruction can be readily written in an electric appliance by specifying a control instruction write address.

Furthermore, favorably, the server control unit encrypts the control instruction in the control instruction transmission process.

According to this configuration, since the control instruction received by the portable terminal device has been encrypted, even when using a portable terminal device for which security cannot be readily ensured, security of the control instruction can be ensured.

In addition, favorably, the communication performed by the apparatus communication unit with the portable communication unit is short-range wireless communication.

When the communication between the apparatus communication unit and the portable communication unit is short-range wireless communication, since communication is started as a user brings a portable terminal device close to an unspecified electric appliance, it is difficult for the user to identify an electric appliance which the portable terminal device approaches in advance. Therefore, an address at which object data is stored in the electric appliance to which the user brings the portable terminal device close cannot be identified prior to the start of short-range wireless communication. Even when short-range wireless communication is performed between the apparatus communication unit and the portable communication unit and an address at which object data is stored in the electric appliance cannot be identified prior to the start of short-range wireless communication in this manner, according to the present communication system, object data can be read from the electric appliance storing the data by specifying an address.

The communication system, the electric appliance, and the portable terminal device configured as described above enable data stored in an electric appliance to be readily read to the outside of the electric appliance by specifying an address.

The present application claims priority on the basis of Japanese Patent Application No. 2012-041872 filed on Feb. 28, 2012, the entire contents of which are incorporated herein by reference.

It is to be understood that the specific embodiments or examples described in Best Mode for Carrying Out the Invention are merely illustrative of the technical contents of the present invention, and that the present invention should not be construed as being limited to such specific examples. Obviously, many modifications and variations of the present invention are possible without departing from the spirit of the invention and the scope of the following claims.

INDUSTRIAL APPLICABILITY

The communication system, the electric appliance, and the portable terminal device according to the present invention are useful as a communication system which reads data from an electric appliance storing the data to the outside of the electric appliance by specifying an address.

The invention claimed is:

1. An electric appliance capable of communicating with a portable terminal device, where the electric appliance is one of a group of different type electric appliances, each electric appliance comprising:
   a variable data storage unit including a setting storage area for storing object data configured to provide a service related to the electric appliance, the object data being stored at addresses that differ from each other among the group of electric appliances;
   a fixed data storage unit configured to store fixed data at least including setting address information that indicates an address of the setting storage area at a specific address of a non-volatile memory shared with other electric appliances, the specific address being stored in a memory of the portable terminal device in advance;
   an apparatus communication unit configured to perform near-field wireless communication with the portable terminal device;
   an access control unit configured to:
   read the fixed data stored at the specific address from the fixed data storage unit and to cause the apparatus communication unit to transmit the fixed data to the portable terminal device, when receiving, from the potable terminal device, a read request for reading the fixed data to specify the specific address in response to a touch of the portable terminal device to the electric appliance;
   read the object data stored at the address indicated by the setting address information from the variable data storage unit, and cause the apparatus communication unit to transmit the object data to the portable terminal device, when receiving, from the portable terminal device, a read request for reading the object data to specify the setting address information included in the fixed data; and
   an apparatus control unit, wherein the fixed data includes a control instruction write address,
   the access control unit issues a request to the apparatus control unit to write a control instruction at the control instruction write address when a write request with respect to the control instruction is transmitted from the portable terminal device, and
   the apparatus control unit stores the control instruction at the control instruction write address, and sets an operation of the electric appliance in accordance with the control instruction stored at the control instruction write address.

2. The electric appliance according to claim 1, wherein the apparatus control unit configured to cause the variable data storage unit to store the object data, and the apparatus control unit is configured to cause the fixed storage unit to store information indicating an address of a storage area, in the variable data storage unit, where the object data is stored as the setting address information.

3. The electric appliance according to claim 2, wherein the variable data storage unit further includes a first variable data storage unit and a second variable data storage unit,
   wherein a read request with respect to the variable data storage unit is a read request with respect to the first variable data storage unit or a read request with respect to the second variable data storage unit,
   the apparatus control unit is further configured to cause the first variable data storage unit to store the object data, and
   the access control unit is further configured to determine whether or not the read request with respect to the variable data storage unit that is received by the apparatus communication unit is a read request with respect to the first variable data storage unit, and
   when the read request is a read request with respect to the first variable data storage unit, the access control unit is further configured to specify an address specified by the read request and to issue a request to the apparatus control unit to read the first variable data storage unit, and to indirectly read the object data from the first variable data storage unit by acquiring data read by the apparatus control unit.

4. The electric appliance according to claim 3, wherein the access control unit is further configured to determine whether or not the read request with respect to the variable data storage unit received by the apparatus communication unit is a read request with respect to the second variable data storage unit, and when the read request is a read request with respect to the second variable data storage unit, the access control unit is further configured to directly read the object data stored in the second variable data storage unit from the second variable data storage unit.

5. The electric appliance according to claim 1, wherein the variable data storage unit includes an instruction acceptance area configured to accept writing of a control instruction for instructing an operation to the electric appliance.

6. The electric appliance according to claim 1, wherein the communication performed by the apparatus communication unit with the portable terminal device comprises short-range wireless communication.

7. A portable terminal device that includes a memory and a processor, and is capable of communicating with an electric appliance, where the electric appliance is one of a group of different type electric appliances that store object data at addresses that differ from each other among the group of electric appliances, the portable terminal device comprising:
   a portable communication unit configured to perform near-field wireless communication with an apparatus communication unit of the electric appliance,
   wherein the memory includes a specific address storage unit configured to store a specific address of a non-volatile memory shared by a plurality of electric appliances, and
   the processor includes:
   a fixed data acquisition unit configured to acquire, from the apparatus communication unit, the fixed data stored at the specific address in a storage unit of the electric appliance by causing the portable communication unit to transmit a read request to the apparatus communication unit for reading the fixed data by specifying the specific address in response to a touch of the portable terminal device to the electric appliance; and
   an object data acquisition unit configured to acquire, from the apparatus communication unit, the object data stored at an address corresponding to setting address information included in the fixed data acquired by the fixed data acquisition unit in the storage unit of the electric appliance by transmitting a read request for reading the object data utilized to provide a service related to the electric appliance by specifying the address corresponding to the setting address information,
   the fixed data includes a control instruction write address; and
   the portable communication unit transmits a write request with respect to a control instruction, thereby causing the electric appliance to store the control instruction at the control instruction write address and set an operation of the electric appliance in accordance with the control instruction.

8. The portable terminal device according to claim 7, wherein a format information storage unit configured to store, in advance, a plurality of pieces of format information respectively indicating a meaning of one or a plurality of pieces of information represented by the fixed data and positions, in the fixed data, where the one or the plurality of pieces of information are disposed in association with format identification information that identifies each of the pieces of format information, the fixed data includes the format identification information corresponding to the fixed data itself, and the object data acquisition unit is further configured to acquire the setting address information from the fixed data acquired by the fixed data acquisition unit on the basis of format information stored in the format information storage unit in association with the format identification information included in the fixed data.

9. The portable terminal device according to claim 7, wherein the fixed data includes an error detection code for confirming whether or not the fixed data itself is normal, and the fixed data acquisition unit is further configured to determine whether or not the acquired fixed data is normal on the basis of the error detection code included in the fixed data.

10. A communication method of acquiring data from an electric appliance through near-field wireless communication between the electric appliance and a portable terminal device, where the electric appliance is one of a group of different type electric appliances that store object data at addresses that differ from each other among the group of electric appliances, the communication method comprising:

transmitting a read request to the electric appliance for reading fixed data stored at the specific address in a storage unit of the electric appliance by specifying a specific address of a non-volatile memory shared by a plurality of electric appliances in response to a touch of the portable terminal device to the electric appliance;

receiving, from the electric appliance, the fixed data read by the electric appliance in response to the read request;

transmitting a read request for reading the object data stored at an address corresponding to setting address information included in the fixed data in the storage unit of the electric appliance utilized to provide a service related to the electric appliance by specifying the address corresponding to the setting address information;

receiving, from the electric appliance, the object data read by the electric appliance in response to the read request, the fixed data including a control instruction write address; and transmitting a write request with respect to a control instruction from the portable terminal device, thereby causing the electric appliance to store the control instruction at the control instruction write address and set an operation of the electric appliance in accordance with the control instruction.

11. A non-transitory computer-readable recording medium in which is recorded a computer program to be executed by a portable terminal device that performs near field wireless communication with an electric appliance, where the electric appliance is one of a group of different type electric appliances that store object data at addresses that differ from each other among the group of electric appliances, the recording medium causing the portable terminal device to function as the steps of:

transmitting a read request to the electric appliance for reading fixed data stored at a specific address in a storage unit of the electric appliance by specifying a specific address of a non-volatile memory shared by a plurality of electric appliances in response to a touch of the portable terminal device to the electric appliance;

receiving, from the electric appliance, the fixed data read by the electric appliance in response to the read request;

transmitting a read request for reading the object data stored at an address corresponding to setting address information included in the fixed data in the storage unit of the electric appliance and utilized to provide a service related to the electric appliance by specifying the address corresponding to the setting address information; and receiving, from the electric appliance, the object data read by the electric appliance in response to the read request, the fixed data including a control instruction write address; and transmitting a write request with respect to a control instruction from the portable terminal device, thereby causing the electric appliance to store the control instruction at the control instruction write address and set an operation of the electric appliance in accordance with the control instruction.

12. A communication system comprising:

an electric appliance where the electric appliance is one of a group of different type electric appliances; and a portable terminal device that includes a memory and a processor, and is configured to communicate with the electric appliance, wherein the electric appliance includes:

a variable data storage unit that includes a setting storage area for storing object data utilized to provide a service related to the electric appliance, the object data being stored at addresses that differ from each other among the group of electric appliances;

a fixed data storage unit configured to store fixed data at least including setting address information that indicates an address of the setting storage area at a specific address of a non-volatile memory where the fixed data is shared with other electric appliances, the specific address being stored in a memory of the portable terminal device in advance;

an apparatus communication unit configured to perform near field wireless communication with the portable terminal device; and an access control unit configured to:

read the fixed data stored at the specified address from the fixed data storage unit, and to cause the apparatus communication unit to transmit the fixed data to the portable terminal device, when receiving, from the potable terminal device, a read request for reading the fixed data to specify the specific address in response to a touch of the portable terminal device to the electric appliance; and read the object data stored at the address indicated by the setting address information from the variable data storage unit, and cause the apparatus communication unit to transmit the object data to the portable terminal device, when receiving, from the portable terminal device, a read request for reading the object data to specify the setting address information included in the fixed data, and an apparatus control unit, wherein the fixed data includes a control instruction write address, the access control unit issues a request to the apparatus control unit to write a control instruction at the control instruction write address when a write request with respect to the control instruction is transmitted from the portable terminal device, and the apparatus control unit stores the control instruction at the control instruction write address, and sets an operation of the electric appliance in accordance with the control instruction stored at the instruction write address, and the portable terminal device includes:

a portable communication unit configured to perform near-field wireless communication with the apparatus communication unit, wherein the memory of the portable terminal device includes a specific address storage unit configured to store the specific address, and the processor of the portable terminal device includes:

a fixed data acquisition unit configured to acquire, from the apparatus communication unit, the fixed data stored at the specific address in the fixed data storage unit, by causing the portable communication unit to transmit, to the apparatus communication unit, a read request for reading the fixed data by specifying the specific address in response to a touch of the portable terminal device to the electric appliance; and an object data acquisition unit configured to acquire, from the apparatus communication unit, the object data stored at an address corresponding to the setting address information included in the fixed data acquired by the fixed data acquisition unit and in the variable data storage unit by transmitting a read request for reading the object data by specifying the address corresponding to the setting address information, and the portable communication unit transmits a write request with respect to a control instruction, thereby causing the electric appliance to store the control instruction at the control instruction write address and set an operation of the electric appliance in accordance with the control instruction.

13. The communication system according to claim 12, wherein the electric appliance further includes an apparatus encryption unit configured to encrypt the object data, when a read request with respect to the variable data storage unit is received by the apparatus communication unit, the access control unit is configured to cause the encryption unit to encrypt read data that is read from a read address specified by the received read request and to cause the apparatus communication unit to transmit the encrypted read data to the portable terminal device, the object data acquisition unit is further configured to acquire the encrypted object data, and the communication control unit is further configured to acquire the encrypted object data.

* * * * *